United States Patent
Dutta et al.

(10) Patent No.: US 10,339,470 B1
(45) Date of Patent: Jul. 2, 2019

(54) TECHNIQUES FOR GENERATING MACHINE LEARNING TRAINING DATA

(71) Applicant: Amazon Technologies, Inc., Seattle, WA (US)

(72) Inventors: Archiman Dutta, Kirkland, WA (US); Rahul Gupta, Los Angeles, CA (US); Subhadeep Chakraborty, Seattle, WA (US); Dhinesh Kumar Dhanasekaran, Seattle, WA (US); Deepak Kumar Nayak, Seattle, WA (US); Avik Sinha, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 618 days.

(21) Appl. No.: 14/967,174

(22) Filed: Dec. 11, 2015

(51) Int. Cl.
*G06N 20/00* (2019.01)

(52) U.S. Cl.
CPC .................... *G06N 20/00* (2019.01)

(58) Field of Classification Search
USPC .......................................................... 706/12
See application file for complete search history.

(56) References Cited

U.S. PATENT DOCUMENTS

| 7,953,676 | B2* | 5/2011 | Agarwal | G06Q 10/04 706/12 |
| 8,704,832 | B2* | 4/2014 | Taylor | G06T 13/00 345/419 |
| 8,977,622 | B1* | 3/2015 | Dutta | G06F 16/285 707/740 |
| 9,292,574 | B2* | 3/2016 | Hsiao | G06F 16/24568 |
| 9,373,165 | B2* | 6/2016 | Azordegan | G01B 11/24 |
| 9,619,914 | B2* | 4/2017 | de Aguiar | G06T 13/40 |
| 9,703,836 | B2* | 7/2017 | Hsiao | G06F 16/24568 |
| 9,704,102 | B2* | 7/2017 | Baraniuk | G06N 99/005 |
| 9,830,344 | B2* | 11/2017 | Dutta | G06F 16/285 |
| 2010/0073361 | A1* | 3/2010 | Taylor | G06T 13/00 345/419 |
| 2010/0259547 | A1* | 10/2010 | de Aguiar | G06T 13/40 345/474 |

(Continued)

OTHER PUBLICATIONS

Journal of Machine Learning Research 7 (2006) pp. 1-30 Submitted Apr. 2004; Revised Apr. 2005; Published Jan. 2006 Statistical Comparisons of Classifiers over Multiple Data Sets Janez.Demsar@Fri. Uni-Lj.Si Faculty of Computer and Information Science Ljubljana, Slovenia.*

(Continued)

*Primary Examiner* — Michael B Holmes
(74) *Attorney, Agent, or Firm* — Kilpatrick Townsend & Stockton LLP

(57) ABSTRACT

Techniques are provided herein for utilizing a classification engine to improve a classification model. For example, a classification engine may derive a statistical model based at least in part on a synthetic data set. A misclassification may be determined based at least in part on an output of the statistical model. An audit question may be provided to an individual, the audit question being determined based at least in part on the determined misclassification. Response data related to the audit question may be received. The statistical model may be validated based at least in part on the response data.

20 Claims, 13 Drawing Sheets

(56) References Cited

U.S. PATENT DOCUMENTS

| | | | | |
|---|---|---|---|---|
| 2010/0274770 A1* | 10/2010 | Gupta | ................... | G06F 16/951 707/688 |
| 2014/0004588 A1* | 1/2014 | Doran Peterson | ... | C12N 9/2465 435/162 |
| 2014/0160116 A1* | 6/2014 | de Aguiar | ............... | G06T 13/40 345/419 |
| 2014/0272914 A1* | 9/2014 | Baraniuk | ............. | G06N 99/005 434/362 |
| 2014/0279727 A1* | 9/2014 | Baraniuk | ............. | G06N 99/005 706/11 |
| 2014/0313207 A1* | 10/2014 | Taylor | ..................... | G06T 13/00 345/474 |
| 2015/0161187 A1* | 6/2015 | Dutta | ................... | G06F 16/285 707/748 |
| 2015/0170536 A1* | 6/2015 | Lan | ......................... | G09B 7/02 434/350 |

OTHER PUBLICATIONS

ScienceDirect Elsevier Ecological Modelling vol. 199, Issue 2, Nov. 16, 2006, pp. 188-196 Comparative performance of generalized additive models and multivariate adaptive regression splines for statistical modelling of species distributions J.R. Leathwick, J. Elith b, T. Hastie c.*

ACM Digital Library Predictive discrete latent factor models for large scale dyadic data Deepak Agarwal Yahoo! Research Srujana Merugu Yahoo! Research KDD '07 Proceedings of the 13th ACM SIGKDD international conference on Knowledge discovery and data mining pp. 26-35 Aug. 12-15, ACM.*

Statistica Sinica Jul. 1997, pp. 841-854 Transformation Models for Interval Scale Grouped Data With Applications Henry Horng-Shing Lu and Fushing Hsieh National Chiao Tung University and National Taiwan University.*

ScienceDirect Computational Statistics & Data Analysis vol. 50, Issue 4, Feb. 24, 2006, pp. 1113-1130 Mining the customer credit using classification and regression tree and multivariate adaptive regression splines Tian-Shyug Lee, Chih-Chou-Chiu, Yu-Chao Chou, Chi-Jie Lu.*

ScienceDirect Accident Analysis & Prevention vol. 38, Issue 5, Sep. 2006, pp. 1019-1027 Analysis of traffic injury severity: An application of non-parametric classification tree techniques, Li-Yen Chang, Hsiu-Wen Wang.*

ScienceDirect Decision Support Systems vol. 50, Issue 3, Feb. 2011, pp. 559-569 The application of data mining techniques in financial fraud detection: A classification framework and an academic review of literature E.W.T. Ngai, Yong Hu, Y.H. Wong, Yijun Chen, Xin Sun.*

Mason et al., "An N-gram Based Approach to Automatically Identifying Web Page Genre", *HICSS'09: 42nd Hawaii International Conference on System Sciences*, IEEE (2009), 10 pages.

McCallum et al., "A Comparison of Event Models for Naive Bayes Text Classification", *AAAI-98 Workshop on Learning for Text Categorization*, vol. 752 (1998), 8 pages.

Nigam et al., "Text classification from Labeled and Unlabeled Documents Using EM", *Machine learning* (2000), 34 pages.

Nigam et al., "Using Maximum Entropy for Text Classification", *IJCAI-99 Workshop on Machine Learning for Information Filtering*, vol. 1 (1999), 7 pages.

Tong et al., "Support Vector Machine Active Learning with Applications to Text Classification", *Journal of Machine Learning Research* (2001), pp. 45-66.

* cited by examiner

US 10,339,470 B1

TECHNIQUES FOR GENERATING MACHINE LEARNING TRAINING DATA

BACKGROUND

In machine learning and statistics, classification is a problem of identifying to which of a set of categories a new observation belongs, on the basis of a training set of data containing observations. For example, inventories of items are often classified into categories for the convenience of users who browse these inventories. Inventory providers often organize items according to a classification scheme (e.g., a browse tree) that indicates a relationship between item categories (e.g., classifications) and items in inventory. In some cases, an item may be classified as belonging to multiple categories. Misclassified items can produce negative consequences. Continuing with the inventory example, misclassifications can negatively impact a user's searching experience. However, identifying misclassifications is not a trivial task. Providers often have to train workers to manually classify items. Training these workers can be costly and time-consuming. Even experienced classifiers can provide low through-put depending on the number of experienced classifiers and the size and complexity of the catalog being classified. Due to the high costs associated with trained workers who classify and maintain the classifications (e.g., in an electronic catalog), providers (e.g., electronic marketplace providers) may turn to crowdsourcing tasks to aid them in identifying misclassifications. While classifications provided by crowdsource users are certainly less expensive, it is often the case that they are also less accurate. Classifications utilizing crowdsourcing also tends to have low-throughput. Conventional techniques can make it costly to identify misclassifications in a wide variety of contexts.

BRIEF DESCRIPTION OF THE DRAWINGS

Various embodiments in accordance with the present disclosure will be described with reference to the drawings, in which.

DETAILED DESCRIPTION

Figure 1:
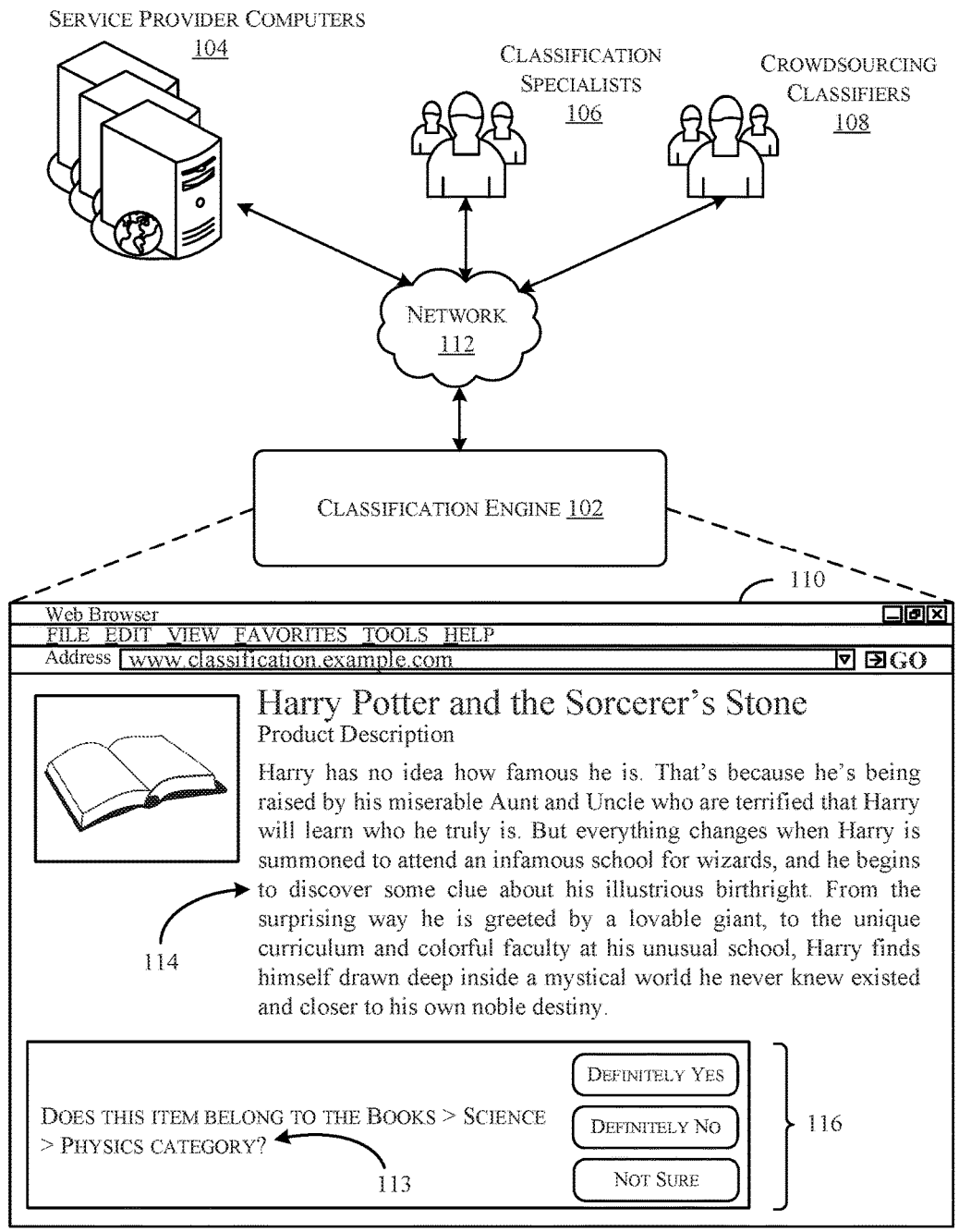
FIG. 1 is a schematic diagram illustrating an example environment suitable for implementing aspects of a classification engine, in accordance with at least one embodiment.

Techniques described herein are directed to providing a process for improving a statistical model using a synthetic data set and response data. In at least one example, the process utilizes a classification engine. A "classification," as used herein, is intended to refer to an item category related to, for example, an item (e.g., an item offered for consumption on an electronic marketplace). A "misclassification," is intended to refer to an association between an item category and an item, for which no association should exist because the item category does not appear to relate to the item. An "electronic marketplace," as used herein, is intended to refer to a computer-facilitated market for participants (e.g., buyers and sellers) to conduct transactions including commercial and/or financial transactions. An "item" is intended to refer to a product, a service, a sellable unit, or anything else that may be managed or otherwise physically or electronically stored as inventory.

"Machine learning techniques," as included herein, are intended to include, but are not limited to, supervised learning, unsupervised learning, and/or semi-supervised learning. In supervised learning, a statistical model is prepared through a training process where it is required to make predictions and is corrected when those predictions are incorrect. The training process may continue until the model achieves a desired level of accuracy on the training data. Supervised machine learning techniques are often used to solve classification and regression problems. Example supervised machine learning algorithms include logistic regression and neural networks. In unsupervised learning, a model is prepared by deducing structures present in the input data. This may be accomplished, for example, by extracting general rules, or by utilizing a mathematical process of systematically reducing redundancy, or by organizing data by similarity. Unsupervised machine learning techniques are often used to solve problems associated with clustering, dimensionality reduction, and association rule learning. Example unsupervised machine learning algorithms include the Apriori algorithm and K-means algorithms. In semi-supervised learning, input data includes a mixture of labelled and unlabeled example. The model must learn the structures to organize the data as well as make predictions. Semi-supervised machine learning techniques are often used to solve classification and regression problems.

In a non-limiting example, a process may be provided for improving a statistical model using a synthetic data set and response data. For example, a collection of items may be obtained. One or more of the items may, or may not, be associated with a classification. A synthetic data set may be derived from the collection of items. For example, a random classification may be assigned to each of the items in the collection. A statistical model may be generated to score the collection items according to items that are most likely to be misclassifications. An audit question may be determined based on identified misclassifications and the audit question may be provided to a group of crowdsourcing classifiers. Responses from the crowdsourcing classifiers may be utilized to identify inaccuracies in the model. The model may be re-trained using the response data in order to provide more accurate determinations of misclassifications. As the process is repeated over time, the statistical model may provide exceedingly more accurate determinations, enabling a system for accurately determining when an item has been misclassified with little, to no initial training data, where the system is configured to improve as additional response data is provided.

In accordance with at least one embodiment, an electronic marketplace provider may offer a number of items in an online catalog. While the provider may have a number of experienced classifiers (e.g., classification specialists) who are capable of classifying items and/or finding misclassification in the catalog, the provider may wish to lower the costs associated with initializing/maintaining such classifications. Additionally, the provider may desire to utilize crowdsourcing classifiers to provide classifications as crowdsourcing classifiers are generally, much cheaper than classification specialists. However, the provider may also be aware of the fact that crowdsourcing classifiers are not as accurate as classification specialists. In at least one example, the provider may be aware that the crowdsourcing classifiers, in general, are good predictors of misclassifications. Accordingly, the provider may generate a statistical model in order to predict when the crowdsourcing classifiers will identify an item as being misclassified. Using the statistical model, the provider may increase through-put of the crowd-sourced classifications by using predicted data sets as further input. Through-put may be increased generally, and/or, for times when crowdsourcing classifiers are unavailable or slow (e.g., holidays). In at least one embodiment, an audit question may be determined based on the statistical model. In other words, the provider may utilize the statistical model to determine when crowdsourcing classifiers are likely to determine that an item has been misclassified. Based on the output of the statistical model (e.g., a 90% likelihood that crowdsourcing classifiers will determine that this particular item is misclassified), an audit question may be determined from a number of audit questions. More specifically, only the audit questions determined using the statistical model will be presented to the crowdsourcing classifiers. This can significantly reduce unnecessary audit questions from being posed to the crowdsourcing classifiers. For example, it is likely unnecessary to ask a crowdsourcing community about the majority of classifications in a catalog. It is likely far more beneficial to ask audit questions related only to items that have a high likelihood of being misclassified. Given that crowdsourcing classifiers may provide a mechanism for identifying such misclassifications, generating and utilizing a statistical model for predicting when crowdsourcing classifiers will indicate that an item is misclassified provides a lower-cost solution than paying experienced, trained workers, to identify misclassifications. Additionally, because responses to the audit questions may be used to adjust the statistical model, the process described above enables the statistical model to provide more accurate predictions over time.

In at least one embodiment, the provider may desire to increase the quality of the responses provided by crowdsourcing classifiers. It is often the case, that because the crowdsourcing classifiers are traditionally low-paid, the quality of their responses are not as high as say, a classification specialist. Therefore, it is desirable to increase the quality of the responses in order to obtain more meaningful results. A number of techniques may be employed in order to increase the quality of responses made by a crowdsourcing community. For example, crowdsourcing classifiers' qualifications may be determine using a number of sample tasks directed to determine the classifier's domain knowledge. These sample tasks may include posing audit questions to a classifier for which the correct response to the audit question is known (e.g., golden questions). Classifiers who meet a certain accuracy bar (e.g., above a threshold number of correct answers to golden questions, above a threshold percentage of correct answers to golden questions, etc.) may be added to a pool of classifiers for which audit questions may be provided. Classifiers that do not meet the accuracy bar may be excluded from the pool. Alternatively, responses from classifiers that do not meet the accuracy bar may be weighed less heavily than responses from classifiers that do meet the accuracy bar. In at least one example, biases may be removed from the crowdsourced responses by providing the crowdsourcing classifier a range of responses to choose from rather than a options for yes and no only. Additionally, or alternatively, bias regarding qualification/golden questions may still contain some bias. Therefore, techniques are disclosed herein for reducing the bias by reducing single-worker judgements. For example, each audit question may be sent to a number of crowdsourcing classifiers (e.g., three or more). A majority vote, or complete agreement, may be required before an answer may be added to the response data for the task. In some examples, demographic bias may be reduced by providing a sample of crowdsourcing tasks at different times across a time period (e.g., a week). This would ensure that different crowdsourcing populations (e.g., a crowdsourcing population in the United States, a crowdsourcing population in India, etc.) who are active during different times of the data are more accurately represented in the response data. In some examples, response data from the crowdsourcing classifiers may be weighed according to an accuracy of the crowdsourcing classifiers at responding to golden questions. Further, during holidays, for example, where crowdsourcing classifiers may be low in supply, historical crowdsourcing data may be utilized to calculate an overlap between a historical crowdsourcing population and a current crowdsourcing populations in order to apply a weight to the response data submitted by the current crowdsourcing population. Thus, the system may be made more resilient to missing data when crowdsourcing populations are low.

Although examples included herein may be focused contextually on inventory scenarios, it should be appreciated that these examples may equally apply to any suitable classification task.

The techniques disclosed herein, address, at least, an internet-centric challenge of classifying and maintaining classifications for online inventories. The techniques further herein solve an Internet-centric problem with a solution that is necessarily rooted in computer technology. For example, machine-learning algorithms typically require a training set of data for which at least some classifications are already known. However, the system and methods described herein may utilize a data set for which no known, or perhaps very few, classifications exist. The system is able to learn from classification mistakes utilizing feedback from a group of crowdsourcing users in order to produce, over time, a better statistical model that more accurately predict misclassifications. Specifically, by using the statistical model to determine when crowdsource users are to identify a classification as being misclassified, the number of audit questions required to improve the model may be reduced. Improving the quality of response data from a crowdsourcing population, identifying misclassifications by predicting response data from a crowdsourcing population, and providing audit questions only for identified misclassification, are merely a few improvements discussed herein.

FIG. 1 is a schematic diagram illustrating an example environment 100 suitable for implementing aspects of a classification engine 102, in accordance with at least one embodiment. For example, the classification engine 102 may cause (e.g., via the service provider computers 104) an audit question to be provided to classification specialists 106 and/or crowdsourcing classifiers 108. For example, the classification engine 102 may generate and maintain a statistical model for determining when the crowdsourcing classifiers 108 are likely to indicate that an item (e.g., an item stored as inventory on the service provider computers 104) is misclassified.

The service provider computers 104 (e.g., an electronic marketplace provider, a financial services provider, a social media provider, etc.), the classification engine 102, the classification specialists 106, and/or the crowdsourcing classifiers communicate with one another via network 112. Network 112, and any network described herein, can include any appropriate network, including an intranet, the Internet, a cellular network, a local area network, a wide area network, or any other such network or combination thereof. The communication may be transmitted electronically or physically communicated over, for example, a telephone (e.g., using an automated service).

In accordance with at least one embodiment, the service provider computers 104 may host one or more network pages (e.g., webpage 110) associated with the provider. The classification specialists 106 and/or the crowdsourcing classifiers 108 may interact with the webpage 110 in order to provide response data to the classification engine 102. In a non-limiting example, the service provider computers 104 may be operated by an electronic marketplace provider that provides a catalog of items (e.g., books) for consumption on the electronic marketplace. Some of these items may be misclassified. The electronic marketplace provider may incur higher costs to have the classification specialists 106 classify the items in the catalog than the costs the provider would incur were the crowdsourcing classifiers 108 to provide and/or maintain such classifications.

In accordance with at least one embodiment, the classification engine 102 may generate a statistical model for predicting when the crowdsourcing classifiers 108 are likely to determine that an item is misclassified. Accordingly, the classification engine 102 may identify an audit question based on the likelihood. For example, if the likelihood is high (e.g., 90% or greater) that the crowdsourcing classifiers 108 will indicate that an item (e.g., a Harry Potter book) has been misclassified, an audit question corresponding to the current item classification may be determined from a collection of audit questions. In at least one example, the item corresponding to the item description 114 may be classified (albeit incorrectly) to a category (e.g., books.science.physics). The classification may have been randomly generated by the classification engine 102 during a process for generating a synthetic data set. Alternatively, the item corresponding to item description 114 may not be associated with a classification. An audit question 113 may be selected that pertains to ascertaining whether the item is correctly included in the books.science.physics category. In some examples, the output of the statistical model (e.g., output associated with crowdsource users) may be compared to a classification set obtained by a set of experienced workers. If ratio of agreement between the with a threshold range (e.g., 45%-55% likely) than a particular audit question of the collection of audit question may be selected (e.g., an audit question pertaining to multiple categories, for example, "Does this book belong in both category A and category B?"). If the output of the statistical model provides that the likelihood that an item is misclassified is within a high threshold range (e.g., 90-100% likely, >75% likely, etc.) than an particular audit question from a collection of audit questions may be determined (e.g., "Does this book belong in category A?"). Although not shown in FIG. 1, in some examples, the audit question may simply ask the crowdsource users "To what category does this book belong?" The crowdsource user may enter in a suitable classification. It should be appreciated that other audit questions may be determined from, and included in, a collection of audit questions. The output from the statistical model, as well as any available data set corresponding to the classification specialists 106, may be utilized in any suitable combination to determine an appropriate audit question. The classification engine 102 may cause webpage 110 to be provided to the crowdsourcing classifiers 108. The crowdsourcing classifiers 108 may utilize the item description 114 and provided user interface elements (e.g., the buttons 116) to respond to the audit question 113. Responses to the audit question 113 may be received and processed by the classification engine 102 in order to maintain or modify a classification associated with an item in inventory. In at least one example, the classification engine 102 may retrain a statistical model according to the responses to the audit question 113, enabling the statistical model to more accurately determine predicted misclassifications.

Figure 2:
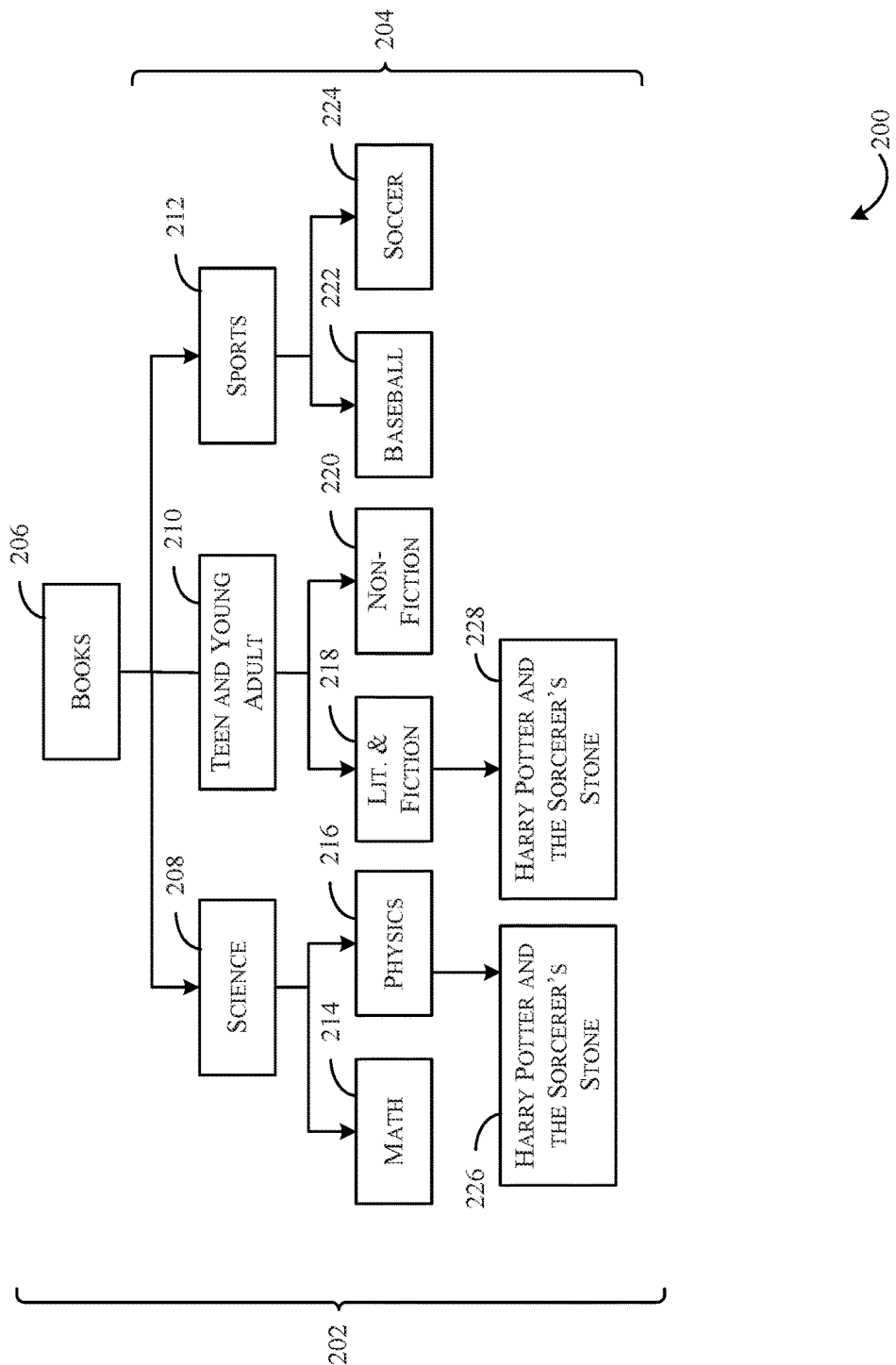
FIG. 2 is a schematic diagram of a browse tree, in accordance with at least one embodiment.

FIG. 2 is a schematic diagram 200 of a browse tree 202, in accordance with at least one embodiment. A browse tree is one type of classification scheme that may be developed, for example, by a catalog specialist to aid in categorizing items within a catalog. The browse tree can define relationships between categories and items. For example, nodes 204 are all categorized under the category "books" as the nodes 204 are all child nodes of root node 206. Accordingly, node 208, node 210, and node 212 are each a sub-category of the category "books" associated with root node 206. For each sub-category, another sub-category may exist. For example, node 214, and node 216 may correspond to sub-categories of the sub-category "science" corresponding to the node 208. Node 218, and node 220 may correspond to sub-categories of the sub-category "Teen and Young Adult" corresponding to the node 210. Node 222 and node 224 may correspond to sub-categories of the sub-category "Sports" corresponding to the node 212. Node 226 and node 228 may correspond to a same item in inventory (e.g., a book entitled "Harry Potter and the Sorcerer's Stone). In fact, a single item in inventory may have any number of classifications (e.g., associations with nodes of a browse tree). The browse tree 202 may have any suitable number of levels. Additionally, parent nodes of the browse tree 202 may have any suitable number of child nodes (e.g., none, 1, or more than 1). Further, it should be appreciated that the browse tree 202 is merely an example, and other suitable classifications exist for maintaining classification of a collection of items. In at least one example, node 226 may correspond to a misclassified item and node 228 may correspond to a correctly classified item. An item (e.g., a book) is said to be misclassified if it is assigned to a node to which the item (e.g., the book) has no relation. For example, a Harry Potter book corresponding to the node 226 has nothing to do with the scientific field of physics, thus, the node 226 is said to be misclassified. An item being misclassified has adverse impacts on catalog quality. For example, misclassifications may impact the user's browsing experience because irrelevant books may appear while the user is browsing through the catalog (e.g., or browsing search results from a query). Therefore, removing these misclassified assignments may have a positive impact on the user's online experience overall.

Despite being a problem of importance, detecting book misclassifications is not a trivial task. There are various challenges associated with book misclassification detection. For example, each book may be assigned to multiple categories. Therefore, a system for identifying misclsasification must identify such misclassifications irrespective of the number of browse nodes to which a item node is assigned. Secondly, business rules may not exist that correctly differentiate between correctly-classified items and incorrectly classified items. Thirdly, each of the browse nodes may differ in characteristics. For instance, categories in fiction are usually more subjective than non-fiction nodes. Finally, determining classifications for several genres, for example, presents a highly subjective problem as the genres may not be perfectly separable.

Figure 3:
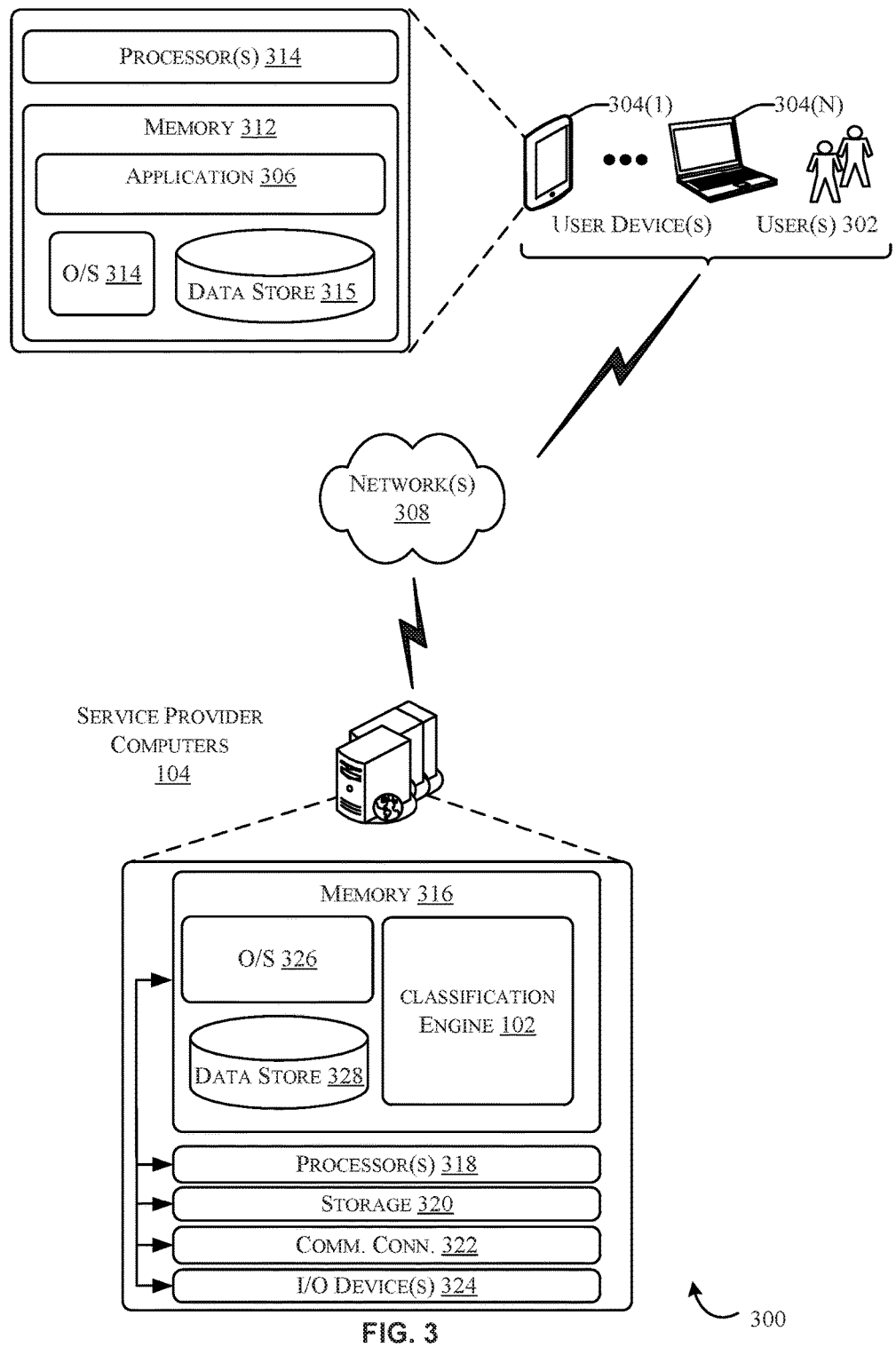
FIG. 3 is an example architecture of the classification engine, in accordance with at least one embodiment.

FIG. 3 is an example architecture 300 of the classification engine 102 (e.g., the classification engine 102 of FIG. 1), in accordance with at least one embodiment. In architecture 300, one or more users 302 (e.g., the classification specialists 106 and/or the crowdsourcing classifiers 108) may utilize user computing devices 304(1)-(N) (collectively, user computing devices 304) to access an application 306 (e.g., an application operating on a mobile device, a web browser, etc.) or a user interface accessible through the application 306 via one or more networks 308 (e.g., the network 112 of FIG. 1). In some aspects, the application 306 may be hosted, managed, and/or provided by a computing resources service or service provider, such as by utilizing one or more service provider computers 104 (the service provider computers 104 of FIG. 1).

In some examples, the networks 308 may include any one or a combination of many different types of networks, such as cable networks, the Internet, wireless networks, cellular networks, and other private and/or public networks. While the illustrated example represents the users 302 accessing the application 306 over the networks 308, the described techniques may equally apply in instances where the users 302 interact with the service provider computers 310 via the one or more user computing devices 304 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 306 may allow the users 302 to interact with the service provider computers 104 (e.g., the service provider computers 104 of FIG. 1) such as to provide response data in response to audit questions. In at least one example, such audit questions may relate to item classification for items offered by an electronic marketplace utilizing the service provider computers 104. The service provider computers 104, perhaps arranged in a cluster of servers or as a server farm, may host the application 306 and/or cloud-based software services. Other server architectures may also be used to host the application 306 and/or cloud-based software services. The application 306 may be capable of handling requests from many users 302 and serving, in response, various user interfaces that can be rendered at the user computing devices 304. The application 306 can present any suitable type of website that supports user interaction, including search engine sites. The described techniques can similarly be implemented outside of the application 306, such as with other applications running on the user computing devices 304.

The user computing devices 304 may be any suitable type of computing device such as, but not limited to, a mobile phone, a smartphone, a personal digital assistant (PDA), a laptop computer, a desktop computer, a thin-client device, a tablet PC, an electronic book (e-book) reader, etc. In some examples, the user computing devices 304 may be in communication with the service provider computers 104 via the networks 308, or via other network connections.

In one illustrative configuration, the user computing devices 304 may include at least one memory 312 and one or more processing units (or processor(s)) 314. The processor(s) 314 may be implemented as appropriate in hardware, computer-executable instructions, firmware, or combinations thereof. Computer-executable instruction or firmware implementations of the processor(s) 314 may include computer-executable or machine-executable instructions written in any suitable programming language to perform the various functions described.

The memory 312 may store program instructions that are loadable and executable on the processor(s) 314, as well as data generated during the execution of these programs. The memory 316 may include an operating system 314, one or more data stores 315, and/or one or more application programs, modules, or services for implementing the features disclosed herein including one or more features of the classification engine 102 of FIG. 1. Depending on the configuration and type of user computing device, the memory 312 may be volatile (such as random access memory (RAM)) and/or non-volatile (such as read-only memory (ROM), flash memory, etc.). The user computing devices 304 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 312 may include multiple different types of memory, such as static random access memory (SRAM), dynamic random access memory (DRAM), or ROM.

Turning to the contents of the memory 312 in more detail, the memory 312 may include an operating system and one or more application programs, modules, or services for implementing the features disclosed herein, such as via the application 306 (e.g., a smart phone application, a tablet application, etc.). The application 306 may be configured to receive, store, and/or display a network page or other interface for interacting with the service provider computers 104. Additionally, the memory 312 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

In some aspects, the service provider computers 104 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 104 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computers 104 may be in communication with the user computing devices 304 and/or other service providers via the networks 308 or via other network connections. The service provider computers 104 may include one or more servers, perhaps arranged in a cluster, as a server farm, or as individual servers not associated with one another. These servers may be configured to implement the content performance management described herein as part of an integrated, distributed computing environment.

In one illustrative configuration, the service provider computers 104 may include at least one memory 316 and one or more processing units (or processor(s)) 318. The processor(s) 318 may be implemented as appropriate in hardware, computer-executable instructions, firmware, or combinations thereof. Computer-executable instruction or firmware implementations of the processor(s) 318 may include computer-executable or machine-executable instructions written in any suitable programming language to perform the various functions described.

The memory 316 may store program instructions that are loadable and executable on the processor(s) 318, as well as data generated during the execution of these programs. Depending on the configuration and type of service provider computers 104, the memory 316 may be volatile (such as RAM) and/or non-volatile (such as ROM, flash memory, etc.). The service provider computers 104 or servers may also include additional storage 320, which may include removable storage and/or non-removable storage. The additional storage 320 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 316 may include multiple different types of memory, such as SRAM, DRAM, or ROM.

The memory 316, the additional storage 320, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 316 and the additional storage 320 are all examples of computer storage media. Additional types of computer storage media that may be present in the service provider computers 104 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 104. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 104 may also contain communications connection(s) 322 that allow the service provider computers 104 to communicate with a stored database, another computing device or server, user terminals and/or other devices on the networks 308. The service provider computers 104 may also include I/O device(s) 324, such as a keyboard, a mouse, a pen, a voice input device, a touch input device, a display, speakers, a printer, etc.

Turning to the contents of the memory 316 in more detail and will be described in further detail in FIG. 4, the memory 316 may include an operating system 326, one or more data stores 328, and/or one or more application programs, modules, or services for implementing the features disclosed herein.

Figure 4:
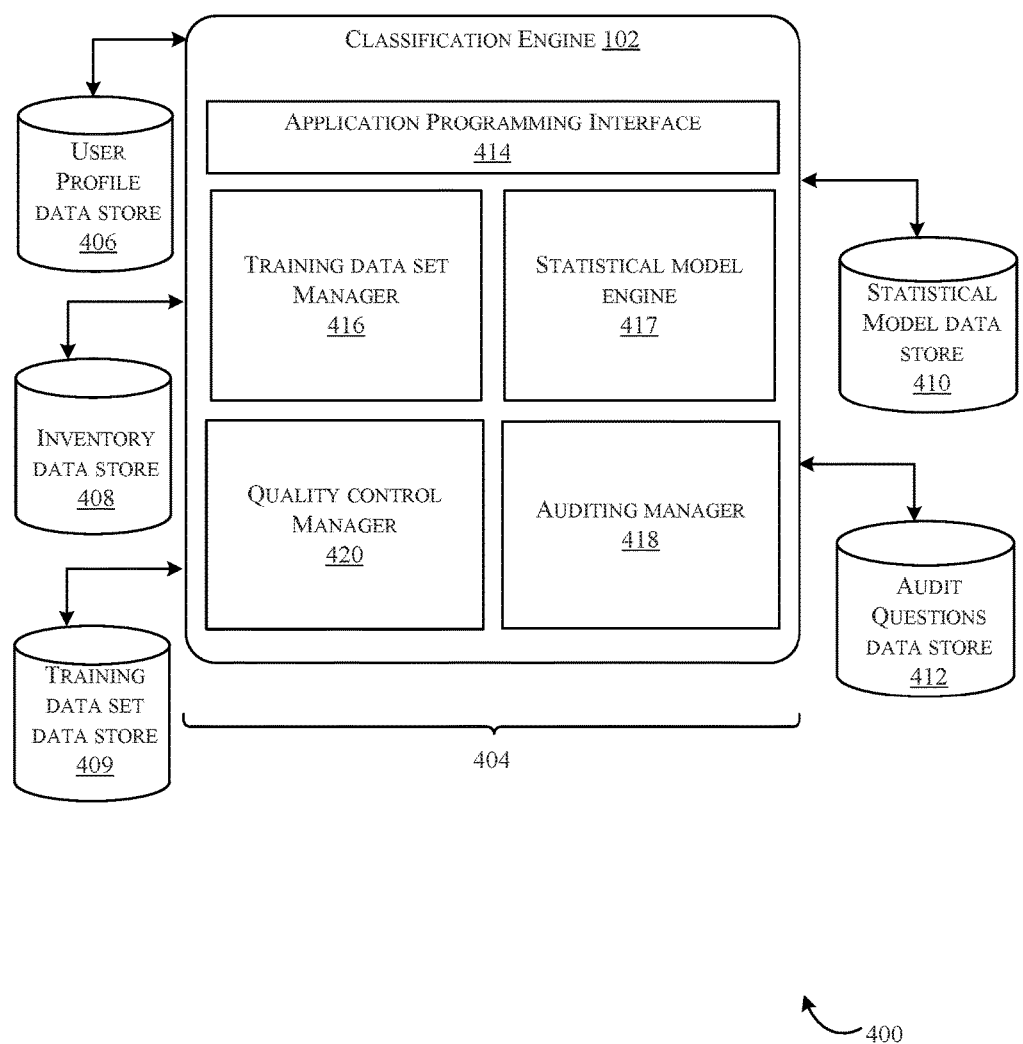
FIG. 4 is a schematic diagram of an example computer architecture for the classification engine, including a plurality of modules that may carry out various embodiments.

FIG. 4 schematically illustrates an example computer architecture 400 for the classification engine 102 of FIG. 1, including a plurality of modules 404 that may carry out various embodiments. The modules 404 may be software modules, hardware modules, or a combination thereof. If the modules 404 are software modules, the modules 404 can be embodied on a computer readable medium and processed by a processor in any of the computer systems described herein. It should be noted that any module or data store described herein, may be, in some embodiments, a service responsible for managing data of the type required to make corresponding calculations. The modules 404 may be configured in the manner suggested in FIG. 4 or the modules 404 may exist as separate modules or services external to the classification engine 102. Any combination of modules 404 may be executed, in whole or in part, on the service provider computers 104 of FIG. 1. Likewise, any combination of modules 404 may be executed, in whole or in part, on the user computing devices 304 of FIG. 3), for example, as part of the application 306 of FIG. 3.

In the embodiment shown in the drawings, a user profile data store 406, an inventory data store 408, a training data set data store 409, a statistical model data store 410, and an audit questions data store 412 are shown, although data can be maintained, derived, or otherwise accessed from various data stores, either remote or local to the classification engine 102, to achieve the functions described herein. Some combination of the data stores depicted in FIG. 4 may be located on the service provider computers 104 of FIG. 1, and/or may be located on the user device(s) 302 of FIG. 3. The classification engine 102, as shown in FIG. 3, includes various modules such as an application programming interface 414, a training data set manager 416, a statistical model engine 417, an auditing manager 418, and a quality control manager 420. Some functions of the modules 414, 416, 417, 418, 420, and 422 are described below. However, for the benefit of the reader, a brief, non-limiting description of each of the modules is provided in the following paragraphs.

In accordance with at least one embodiment, a process is enabled for improving a classification model over time utilizing the classification engine 102 of FIG. 1. In at least one example, the process may include identifying misclassifications of a data set. Input may be received via the application programming interface 414 (e.g., a request to determine misclassification of a data set). In at least some examples, the request may indicate a category of a plurality of categories. In other examples, a request is not necessary to being the process of determining a set of misclassification. For instance, the classification engine 102 may periodically perform such a process according to a schedule or at a periodic rate.

In accordance with at least one embodiment, the training data set manager 416, a component of the classification engine 102, may obtain a training data set. In at least one example, the training data set manager 416 may obtain a training data set from the training data set data store 409. The training data set may include one or more items for which one or more classifications are known. Alternatively, the training data set may include items for which classification are unknown. The training data set may include a number of correct classifications and/or a number of incorrect classifications. The training data set manager 416 may be responsible for assigning classifications to the training data set in order to produce a synthetic data set. In some examples, the training data set manager 416 may randomly assign classifications to the items of the training data set. The training data set manager 416 may assign a classification to, for example, half of the training data set while assigning a different label to the other half of the training data set. The training data set manager 416 may be configured to provide the synthetic data set to the statistical model engine 417, a component responsible for producing and maintaining one or more statistical models (e.g., a classification model). The training data set manager 416 may further be configured to receive response data from, for example, the auditing manager 418. The training data set manager 416 may add the response data to the training data set and may cause the revised training data set to be stored in, for example, the training data set data store 409. The training data set manager 416 may provide the response data/revised training data set to the statistical model engine 417 in order to validate and/or modify a previously-generated statistical model.

In accordance with at least one embodiment, the statistical model engine 417, a component of the classification engine 102, may generate a number of statistical models utilizing any suitable number of machine learning techniques. In at least one example, the statistical model engine 417 may utilize training data received from the training data set manager 416 to generate said statistical models. Rules or instructions associated with the generation of such statistical models may be obtained by the statistical model engine 417 from the statistical model data store 410, a data store configured to store such information. Once models are generated, the statistical model engine 417 may store the statistical models in the statistical model data store 410 for later use. At any suitable time, response data may be received (e.g., in response to a presented audit question) from the training data set manager 416. The statistical model engine 417 may utilize such response data to validate and/or modify a previously-generated statistical model. In at least some embodiments, the statistical model engine 417 may generate any suitable number of statistical models, including language models, maximum entropy models, or any suitable statistical model (e.g., any suitable classification model) that is trained using supervised, unsupervised, or semi-supervised machine learning techniques. In at least some examples, the statistical model engine 417 is response for generating one or more statistical models that may be utilized to predict when a group of users (e.g., the crowdsourcing classifiers 108) will indicate that an item in inventory is misclassified. The statistical model engine 417 may, in some cases, obtain a set of items from, for example, the inventory data store 408. The set of items may correspond to items for which classifications are to be evaluated. An item may be associated with item metadata that includes, but is not limited to one or more browse tree node associations, an item name, an item description, an author, a brand name, a manufacturer, a generic keyword associated with the item, or another suitable item detail. Any suitable combination of these features may be associated with an item.

The statistical model engine 417 may be responsible for generating a feature set for a set of items. The feature set may utilize item information associated with each of the set of items. The statistical model engine 417 may derive a feature set from the item metadata (e.g., and/or features from remote sources of classifications for the set of items) and may store the feature set (e.g., in the training data set data store 409). In some examples, the statistical model engine 417 may store an item's feature set as an association with the item (e.g., in the training data set data store 409 or in the inventory data store 408). In at least one example, a feature of the feature set may be removed based at least in part on a linguistics analysis technique. For example, the statistical model engine 417 may employ a linguistic analysis technique to identify words of the feature set that do not indicate a classification (e.g., a genre of a book, if the item is a book). For example, the statistical model engine 417 may remove prepositions, conjunctions, and articles from the words of the feature set. The statistical model engine 417 may generate a number of unigrams and/or bigrams of the remaining words of the feature set. Unigrams and bigrams are discussed in more depth below, in connection with FIG. 6. The statistical model engine 417 may generate a language model by calculating probabilities for each feature of each feature set for each item in the set of items. The probability may indicate that the item is an outlier, or otherwise misclassified. In at least one embodiment, the statistical model engine 417 may be responsible for generating a number of maximum entropy models. Algorithms for the generation of such models are discussed in further detail below, in connection with FIGS. 7-9. In at least one example, the statistical model engine 417 may utilize regression techniques to combine one or more statistical models into a combined statistical model. The statistical model engine 417 may utilized a number of weights to perform the combination, or the combination may be un-weighted, or a combination of both weighted and un-weighted.

In accordance with at least one embodiment, the auditing manager 418, a component of the classification engine 102, may determine an audit question of a set of audit questions. The audit questions may be predetermined and may be stored in the audit questions data store 412, a data store configured to store audit questions. The audit questions may be associated with one or more categories. For example, a mapping may be provided by the audit questions data store 412 that maps an item category (classification) to one or more audit questions. The auditing manager 418 may be responsible for obtaining a probability that the item is misclassified. For example, the auditing manager 418 may obtain such probabilities from the statistical model engine 417 or from the inventory data store 408 where such probabilities may be stored in associated with an item (e.g., a node of the browse tree 202 of FIG. 2). The auditing manager 418 may perform various operations to determine that the probability that the item is misclassified is within a threshold range, or above a threshold amount. Depending on the results from such operations, the auditing manager 418 may determine a particular audit question from the audit questions data store 412. For example, if the probability that the item is misclassified is around 50%, the auditing manager 418 may determine that a particular questions should be posed to a group of users (e.g., the crowdsourcing classifiers 108 of FIG. 1). In at least one embodiment, if the probability that the item is misclassified is higher than 90%, the auditing manager 418 may determine a difference question should be posed to the group of users. The auditing manager 418 may provide the audit question(s) to the group of users, or cause the audit question(s) to be provided to the group of users via another system (e.g., the service provider computers 104 of FIG. 1). In at least one embodiment, auditing manager 418 may receive user-input indicating an audit question to add or remove from the audit questions data store 412. The auditing manager 418 may perform any suitable function to carry out such a request. Response data may be received by the auditing manager 418 and saved in the inventory data store 408, the statistical model data store 410, or any suitable storage location. The auditing manager 418 may, in at least one example, provide a portion of the response data to the training data set manager 416 in order to adjust a training data set according to the response data. The auditing manager 418 may provide a portion of the response data to the quality control manager 420 in order to improve the quality of response data (e.g., current or future response data).

In accordance with at least one embodiment, the quality control manager 420, a component of the classification engine 102, may interact with the user profile data store 406 in order to maintain information about users (e.g., the crowdsourcing classifiers 108 of FIG. 1). The quality control manager 420 generally may be configured to maintain one or more pools of qualified crowdsourcing users. In at least one example, the quality control manager 420 may utilize a set of questions for which correct answers are known (otherwise known as "golden questions") and provide these golden questions to a set of crowdsourcing classifiers 108. The quality control manager 420 may utilize response data (e.g., from the auditing manager 418) to evaluate the quality of response data received from an individual of the crowdsourcing classifiers 108. For example, the quality control manager 420 may maintain a count of how many golden questions a particular individual of the crowdsourcing classifiers answers correctly as well as a count of how many golden questions have been posed to the particular individual.

In accordance with at least one embodiment, the quality control manager 420 may be responsible for ensuring that, in some cases, a range of response options is provided with the audit questions posed by the auditing manager 418. The quality control manager 420 may further be configured to ensure that the auditing manager 418 provides the audit question(s) according to a schedule, or at particular days and times. The quality control manager 420 may further be configured to determine, from response data received in response to an audit question, that a threshold number of answers have been provided by the crowdsourcing classifiers 108. Accordingly, the quality control manager 420 may determine a majority vote of a number of responses (e.g., three or more responses). The quality control manager 420 may store the majority vote as a single instance of response data in the inventory data store 408, the statistical model data store 410, or any suitable storage location. The quality control manager 420 may be responsible for weighting a user's responses according to a number of calculated evaluations. For example, if the user answers golden questions incorrectly 20% of the time they are presented to him, the user's responses may be weighed proportionally. In other words, a weight may be applied by the quality control manager 420 such that responses from a user who only gets the golden questions correct 20% of the time will not be weighed as heavily as response from a user who answers the golden questions correct 80% of the time. In some cases, the quality control manager 420 may entirely remove a user from one or more pools of users based on accuracy evaluations or for any suitable reason.

Figure 5:
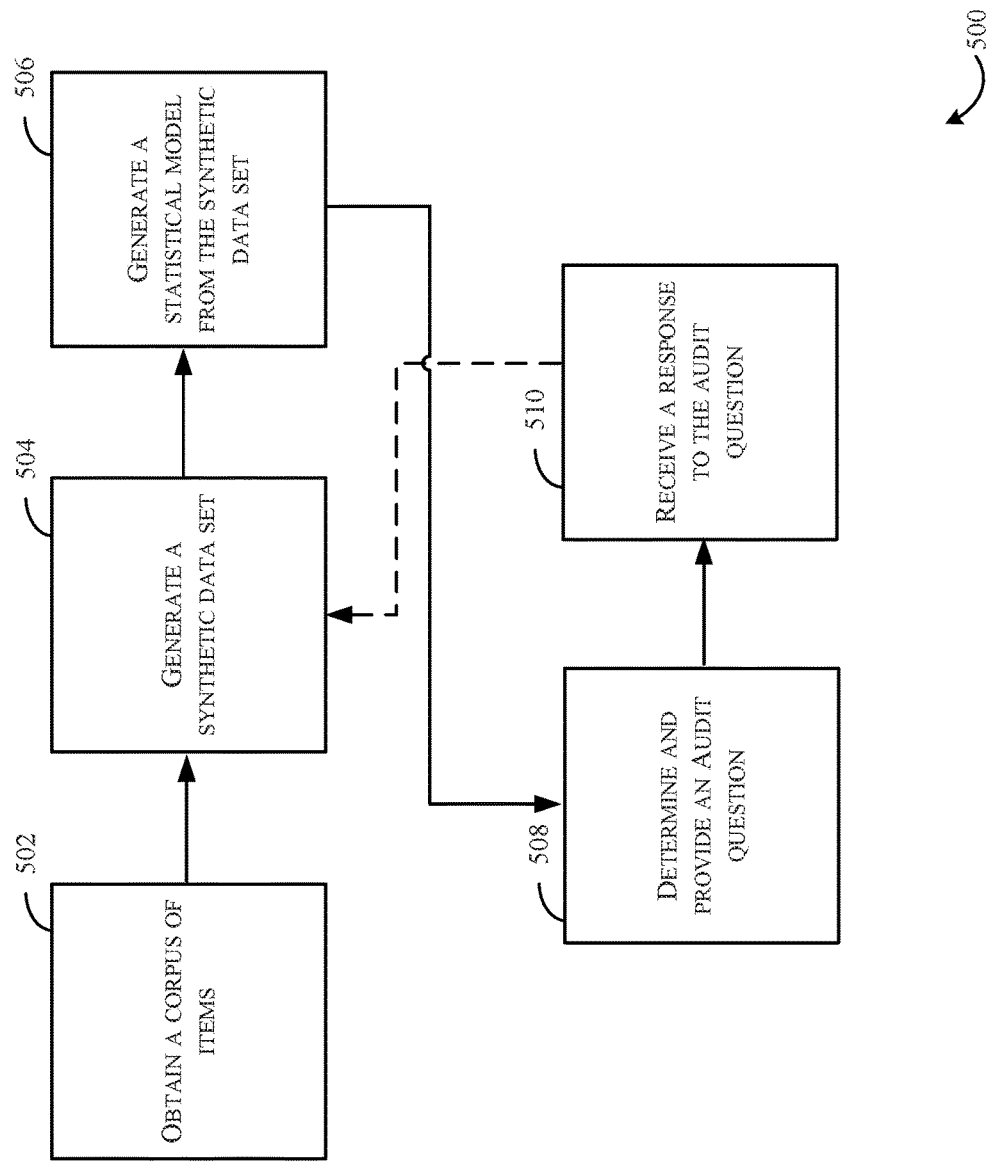
FIG. 5 is a flowchart illustrating an example method for improving a classification model utilizing a synthetic data set and response data, in accordance with at least one embodiment.

FIG. 5 is a flowchart illustrating an example method for improving a classification model utilizing the classification engine, in accordance with at least one embodiment. Identifying misclassifications in a data set, in general, may be a difficult task. For example, determining when a book is misclassified in a catalog may be difficult due to the subjective nature of genres (e.g., classification) to which books are assigned. As a non-limiting example, a classification provider may conduct various experiments to determine how alike responses from the classification specialists 106 are to responses from the crowdsourcing classifiers 108, both of FIG. 1. In at least one example, through such experiment, a classification provider may become aware that a particular group of people (e.g., crowdsource users) are comparatively good detectors of misclassifications (e.g., misclassifications in an inventory catalog). As a non-limiting example, the classification provider may observe that when crowdsourcing classifiers 108 indicate that a classification is correct, they have about 70% agreement with the classification specialists 106. However, when the crowdsourcing classifiers 108 identify the classification as incorrect, they have about 94% agreement with the classification specialists 106. Thus, it may be desirable for the classification provider to generate a statistical model that may be configured to predict when the crowdsourcing classifiers 108 will indicate that a classification in incorrect. Audit questions may be provided to the crowdsourcing classifiers 108 when the item is identified by the statistical model as being potentially misclassified. Responses data associated with the audit questions may be used to further train the statistical model to even more accurately predict classifications that the crowdsourcing classifiers 108 will identify as incorrectly classified.

For example, the process may begin at 502 where a corpus of items may be identified. The corpus of items may be classified or unclassified. Some items of the corpus may be classified while others are not. Some portion of classifications in the corpus may be correct, while some other portion of the classification may be incorrect.

At block 504, a synthetic data set may be generated (e.g., by the classification engine 102). In at least one non-limiting example, the classification engine 102 may randomly associate an item of the corpus with a classification. For example, the classification engine 102 may assign one classification to half of the items in the corpus and a second classification to the other half of the items in the corpus. As another non-limiting example, the classification engine 102 may randomly assign different classification to different portions of the corpus. As another non-limiting example, the classification engine 102 may assign a classification to an item of the corpus based at least in part on metadata associated with the item. Any number of suitable assignments may be utilized, at least some of which, will be discussed in further detail below.

At block 506, the classification engine 102 may generate a statistical model from the synthetic data set using any suitable number of machine learning techniques (e.g., supervised learning, unsupervised learning, and/or semi-supervised learning). For example, the classification engine 102 may generate any suitable number of statistical including, but not limited to, one or more language models and one or more maximum entropy models.

At block 508, the classification engine 102 may determine an audit question, for example, based at least in part on an output from one or more statistical models generated at block 506. In at least one example, the classification engine 102 may determine an association between a classification (e.g., a classification identified by a statistical model as being potentially misclassified) and an audit question. Once determined, the classification engine 102 may cause the audit question to be provided to a user (e.g., the crowdsourcing classifiers 108 of FIG. 1).

At block 510, the classification engine 102 may receive a response to the audit question. The response may be added to the synthetic data set for the statistical model and the model may be validated and/or retrained according to the response. With each iteration of blocks 504-510, the statistical model may become incrementally more accurate with respect to identifying items that a crowdsource user may identify as misclassified.

Figure 6:
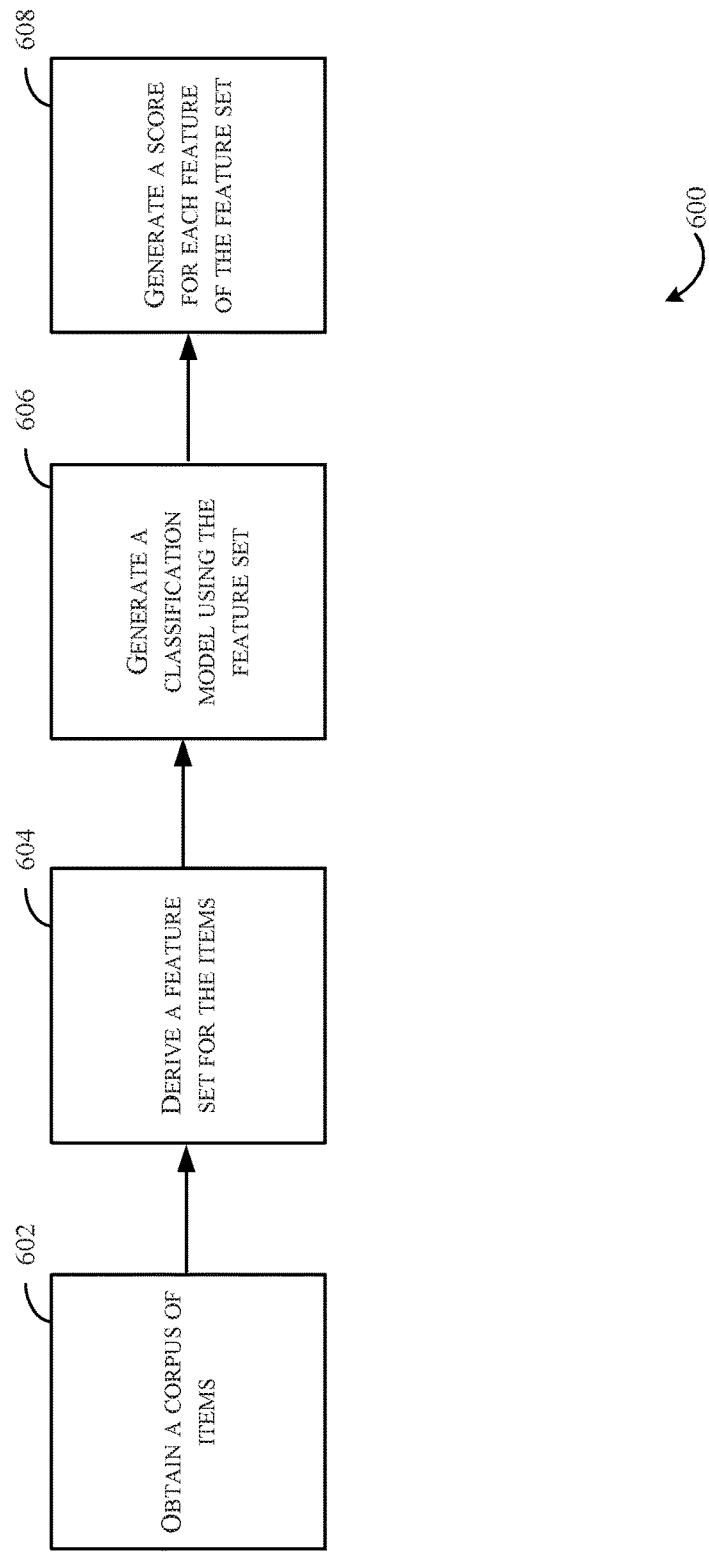
FIG. 6 is a flowchart illustrating an example method for generating a classification model utilizing the classification engine, in accordance with at least one embodiment.

FIG. 6 is a flowchart illustrating an example method 600 for generating a classification model utilizing the classification engine 102 of FIG. 1, in accordance with at least one embodiment. As a non-limiting example, the classification model may include a language model. As discussed above, an item may be assigned to multiple nodes in a browse tree. Thus, features for a classification model must be engineered so that each item classification is judged independently. The method 600 may begin at block 602, where a corpus of items may be obtained. For example, a corpus of items may be associated with a classification label (e.g., books.science-.physics). At block 604 a feature set may be derived for the items in the corpus.

In accordance with at least one embodiment, a feature set for each item may be derived by examining metadata of each item. In some cases, it may be known that certain metadata associated with an item (e.g., a book) is indicative of a book genre. In at least one non-limiting example, book features that are known to be indicative of book genre may include, but are not limited to, an item name, an item description, a number of pages of the item, a brand name, a manufacturer of the item, and/or a generic keyword. Although the example is directed to a book and determining a book genre, it should be appreciated that other feature sets may be determined and utilized for other types of items. In the example at hand, the derived feature set includes the known book features listed above. The feature set may be utilized to associate particular metadata of the item with a particular node of the browse tree 202.

In accordance with at least one embodiment, the derived feature set may be modified by removing a set of stop words. The set of stop words may be predefined and may contain words which are frequently used in the English language (e.g., or some other language) that are not typically indicative of, for example, a book genre (or other classification). Some examples include prepositions, conjunctions, and articles. Removing such words may reduce the dimensionality of the feature space by removing these irrelevant words from the derived feature set.

In at least one embodiment, additional features may be added to the derived feature set based on a combination of the features from the feature set. For example, after removing the stop words, a list of unigrams and/or bigrams may be generated from the features. Unigrams are a list of individual words of a particular type of metadata, while bigrams are pairs of such words. As a non-limiting example, consider a book with the title "Training Heroes," and an item description including the text:

"a former US Navy SEAL Marcus Luttrell's story of survival is well known. In his best seller, Marcus tells the story of Operation Redwing, a mission in the mountains of Afghanistan that left him as the only living member of his team. But one part of Marcus's remarkable story has remained untold until now."

The book would have "training" and "heroes" as unigrams, and "training_heroes" as a bigram. Once unigrams and bigrams are generated, the feature set may be associated with the corresponding node of the browse tree. Two sample feature sets are included below. These samples features sets may have more or fewer features than those provided below.

Exemplary Feature Set for Node 9681295011:
item_name_training_9681295011,
prod_desc_story_9681295011,
prod_desc_well_9681295011,
prod_desc_tells_9681295011,
prod_desc_story 9681295011,
prod_desc_operation 9681295011,
prod_desc_mission_9681295011,
prod_desc_mountains_9681295011,
prod_desc_left_9681295011
Exemplary Feature Set for Node 16571:
item_name_training_16571,
prod_desc_navy_16571,
prod_desc_story_16571,
prod_desc_survival_16571,
prod_desc_well_16571,
prod_desc_tells_16571,
prod_desc_story_16571,
prod_desc_operation_16571,
prod_desc_mission_16571,
prod_desc_left_16571

At block 606, a classification model (e.g., a language model) may be generated using the feature set derived at block 604 (e.g., including or excluding the stop words and/or additional features described above). A "language model" is generated utilizing a standard techniques in automatic speech recognition where a frequency of words is determined in a corpus and score the items in the corpus are scored based on these frequencies. A language model is an unsupervised training technique not requiring labels for training. Predictions using language model may involve two different steps, training on a dataset followed by prediction on the test instances.

In at least one example, a classification model (e.g., the language model) may be trained using the feature set. In at least one example, given a corpus of books under a particular node of the browse tree 202, a frequency may be determined for a feature amongst features of other books in the corpus. For example, continuing on with the example feature set from above, the frequency of how often "training" is included in the title of a book of the corpus may be determined (e.g., utilizing feature item_name_training_16571 amongst all item_name features of other books belonging to the node 16571). The frequency (e.g., the probability of the feature item_name_training_16571) may be determined as follows:

$$P(\text{item\_name\_training\_16571}) =$$

$$\frac{\text{Count of item\_name\_training\_16571}}{\text{Count of all item\_name\_*\_16571 features}}$$

Similarly, for an item description feature, the probability of the feature, prod_desc_training_16571 may be calculated as follows:

$$P(\text{prod\_desc\_training\_16571}) = \frac{\text{Count of prod\_desc\_training\_16571}}{\text{Count of all prod\_desc\_*\_16571 features}}$$

Once a probability is determined for each feature in the corpus, a set of scores for each feature of the features set may be determined at block 608. For example, the score for an item (e.g., a book), S(item), may be computed using the following formula:

$$S(\text{item}) = \sum_{1}^{N} P(\text{feature}_N)$$

Where P is the probability of a feature, feature$_N$ is a single feature of an item's feature set of N number of items in the item's feature set. In at least one example, a low score for an item implies that the item contains features that are not otherwise present in items of the corpus. In some cases, this may imply that a book with a low score is a potential outlier (e.g., misclassified). The probability, P$_{misclassification}$(item), that the item is misclassified may be computed using the following formula:

$$P_{misclassification}(\text{item}) = \log(1 + N \times S(\text{item}))$$

The output (e.g., the probabilities that the item is misclassified) may be utilized alone, or in combination with other statistical models described below in order to identify a set of misclassifications of a corpus of items.

Figure 7:
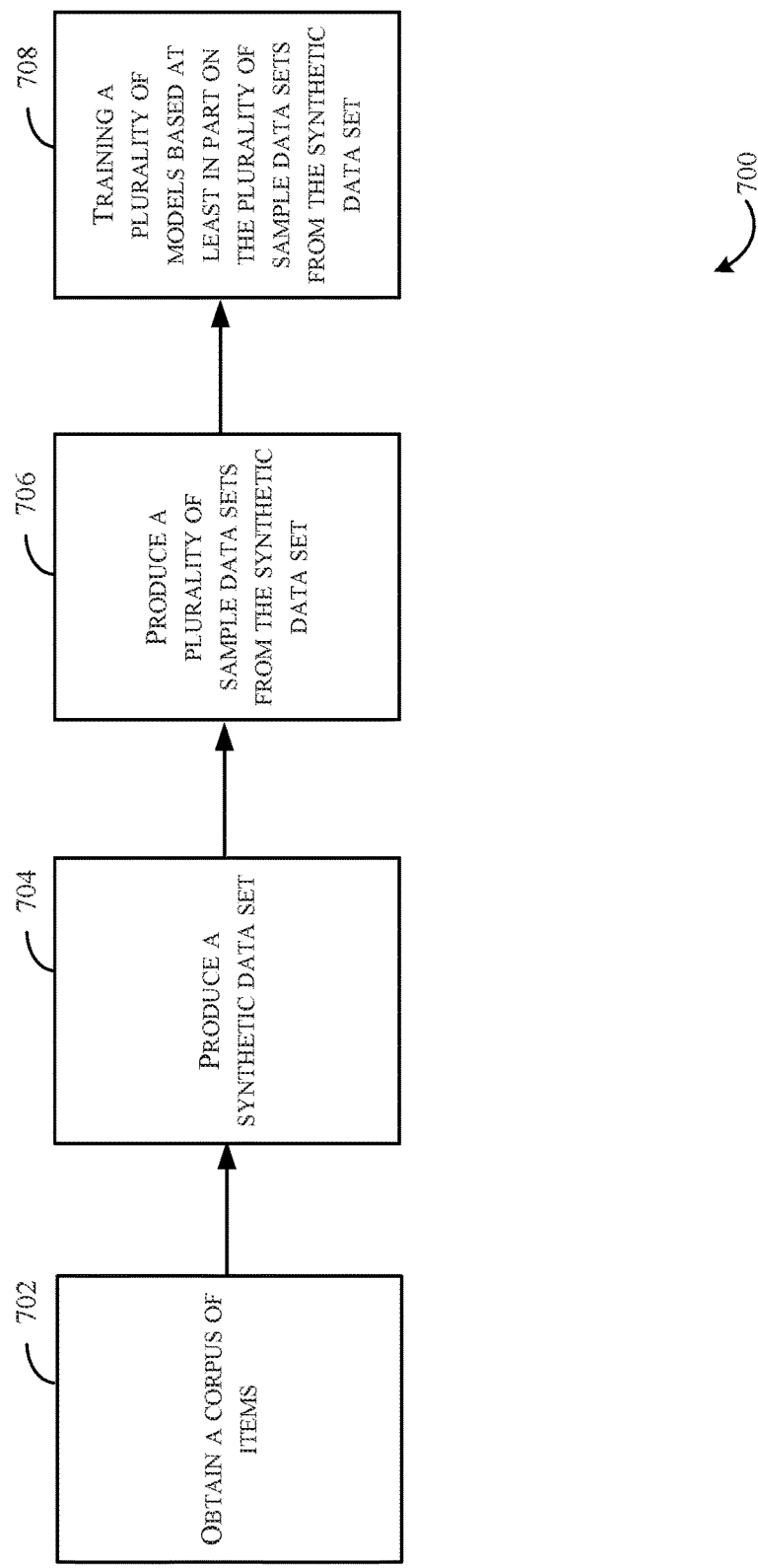
FIG. 7 is a flowchart illustrating another example method for generating a classification model utilizing the classification engine based at least in part on a synthetic data set, in accordance with at least one embodiment.

FIG. 7 is a flowchart illustrating another example method 700 for generating a classification model (e.g., a maximum entropy model) utilizing the classification engine 102 of FIG. 1, based at least in part on a synthetic data set, in accordance with at least one embodiment. A "maximum entropy model" may include a linear classifier that may be utilized for textual classification. A maximum entropy model is a supervised model that needs labeled data for training. In examples where labeled data is unavailable (e.g., no one has classified items in a corpus), then a synthetic data set may be generated.

In at least one embodiment, the method 700 may begin at block 702 where a corpus of items may be obtained. The corpus of items may be individually associated with a classification label.

At block 704, a synthetic data set may be produced. In at least one example, a first set of the corpus of items may be treated as a positive data set, which is to say that the classification associated with the first set of items is assumed to be correct. This is true even though several items in the first set of items may be incorrect classified. A second set of the corpus of items, in some examples, may include items that are associated with a different node of the browse tree 202. Meaning that items originally being classified under a different classification may be selected (e.g., randomly) and assigned to the same classification as the first set of items (e.g., intentionally misclassified). The second set items may be treated as a negative data set (e.g., a data set that includes incorrectly assigned books). The first set and the second set of items, together, may comprise a synthetic data set.

At block 706, the synthetic data set may be utilized to produce a plurality of sample data sets. As a non-limiting, a supervised machine learning technique (e.g., or other machine-learning technique) may be employed to generate a classification model (e.g., a maximum entropy model). Instead of training a single classification model on the synthetic dataset, in some examples, multiple classification models may be trained at block 708. For example, existing data may be randomly sampled to train multiple classification models. In a particular, non-limiting example, four maximum entropy models may utilize a random sub-sampling of the synthetic dataset. Using different samplings of a data set in order to generate multiple models has been known to approximate better classification boundaries than merely training a single classification model. The output of these maximum entropy models may be utilized alone, or in combination with other statistical models described herein, in order to identify a set of misclassifications of the corpus of items.

Figure 8:
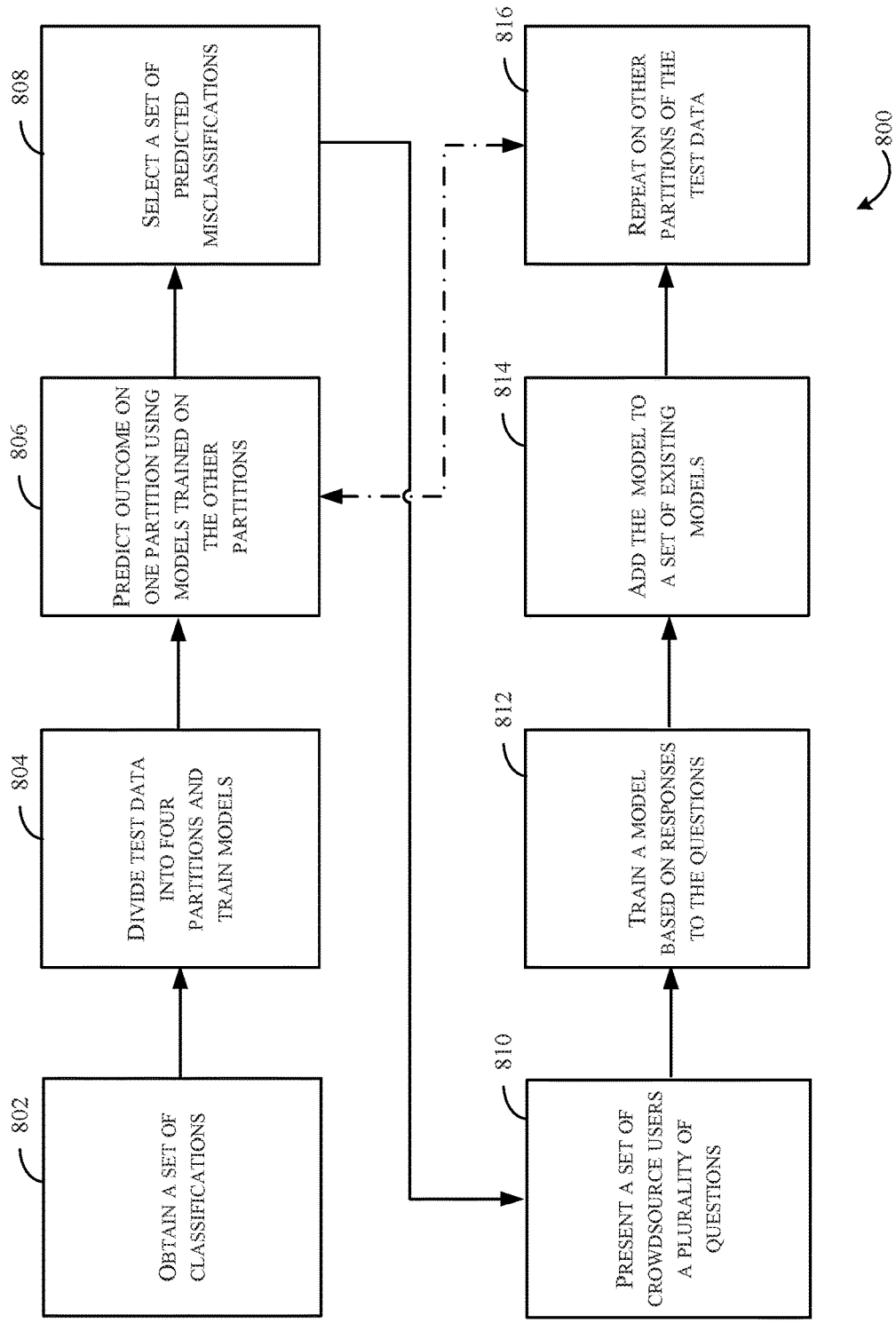
FIG. 8 is a flowchart illustrating a further example method for generating a classification model based at least in part on an active learning technique, in accordance with at least one embodiment.

FIG. 8 is a flowchart illustrating a further example method 800 for generating a classification model utilizing the classification engine 102 of FIG. 1, based at least in part on an active learning technique, in accordance with at least one embodiment. Active learning is a technique where a small set of data points are selectively labeled while training a model. These labeled samples are then later used to retrain the model. In some example, the classification model described in FIG. 8 (e.g., a maximum entropy model) may be initialized with information related to the synthetic data set determined above with respect to FIG. 7, and/or the probabilities determined for the language model of FIG. 6.

In at least one embodiment, the method 800 may begin at block 802 where a set of classification may be obtained. For example, a combination of probabilities from existing models (e.g., any suitable combination of the synthetic data sets/language probabilities discussed with respect to the classification models of FIGS. 6 and 7) may be used to predict misclassifications in a current data set.

At block 804, the test data may be divided into a number of partitions (e.g., four) and a number of statistical models may be trained. For example, a language model and a maximum entropy model of FIG. 7 may be trained using a subset of the number of partitions (e.g., three out of four).

At block 806, outcomes may be predicted for one partition utilizing models trained on the other partitions (e.g., the language model and maximum entropy model trained at block 804). In at least one example, the predictions from the number of models may be combined, each model having equal weight on the combined prediction. In at least some examples, items may be identified to be misclassification for which the combined prediction (e.g., a combined probability) is above a threshold value.

At block 808, a set of predicted misclassifications may be selected. In at least one example, a top number (e.g., the top ten books with the highest probability of misclassification) or a top percentage (e.g., the top 5% of books with the highest probabilities of misclassification) may be selected. In at least one example, the selection may be based at least in part on the combined prediction (e.g., the combined probability that the book is misclassified).

At block 810, a set of crowdsource users are presented a plurality of questions. In at least one example, a question may be posed to a crowdsource user in order to determine whether the identified misclassifications are actually misclassified. For example, an audit questions corresponding to the item category (e.g., "Does this book belong to the Books/Science/Physics category?") may be determined from a collection of audit questions (e.g., questions for each category in the browse tree 202 of FIG. 2. In at least one example, a question may be posed to a crowdsource user to ascertain a classification. For example, an audit question may be determined that may query the crowdsource user to specify the correct classification (e.g., "Could you tell us the correct classification for this book?"). Accordingly, the user, in some cases, may be asked to identify and input the classification he believes is correct. In some cases, the crowdsource user may be provided interface elements in order to specify a classification. Thus, in some cases, the audit question is presented to crowdsourcing classifiers (e.g., the crowdsourcing classifiers 108 of FIG. 1) in the manner depicted in FIG. 1. The crowdsourcing classifiers 108 may submit response data indicating whether or not the item has been misclassified.

At block 812, the model may be trained using the response data obtained in response to the audit question of block 810. At block 814, the trained model may be added to a set of existing models. At block 816, blocks 802-814 may be repeated on other partitions of the test data. After each training of a model at block 812, the trained model may be added to the set of existing models at block 814. Additionally, in some example, for each repetition of blocks 802-814, the outcomes of the most recent model are added with the outcomes of previously-existing models. The un-weighted combination of the models may provide a combined probability that the item is misclassified. The output of the models generated in FIG. 8 may be utilized alone, or in combination with other statistical models described herein, in order to identify a set of misclassifications of a corpus of items.

Figure 9:
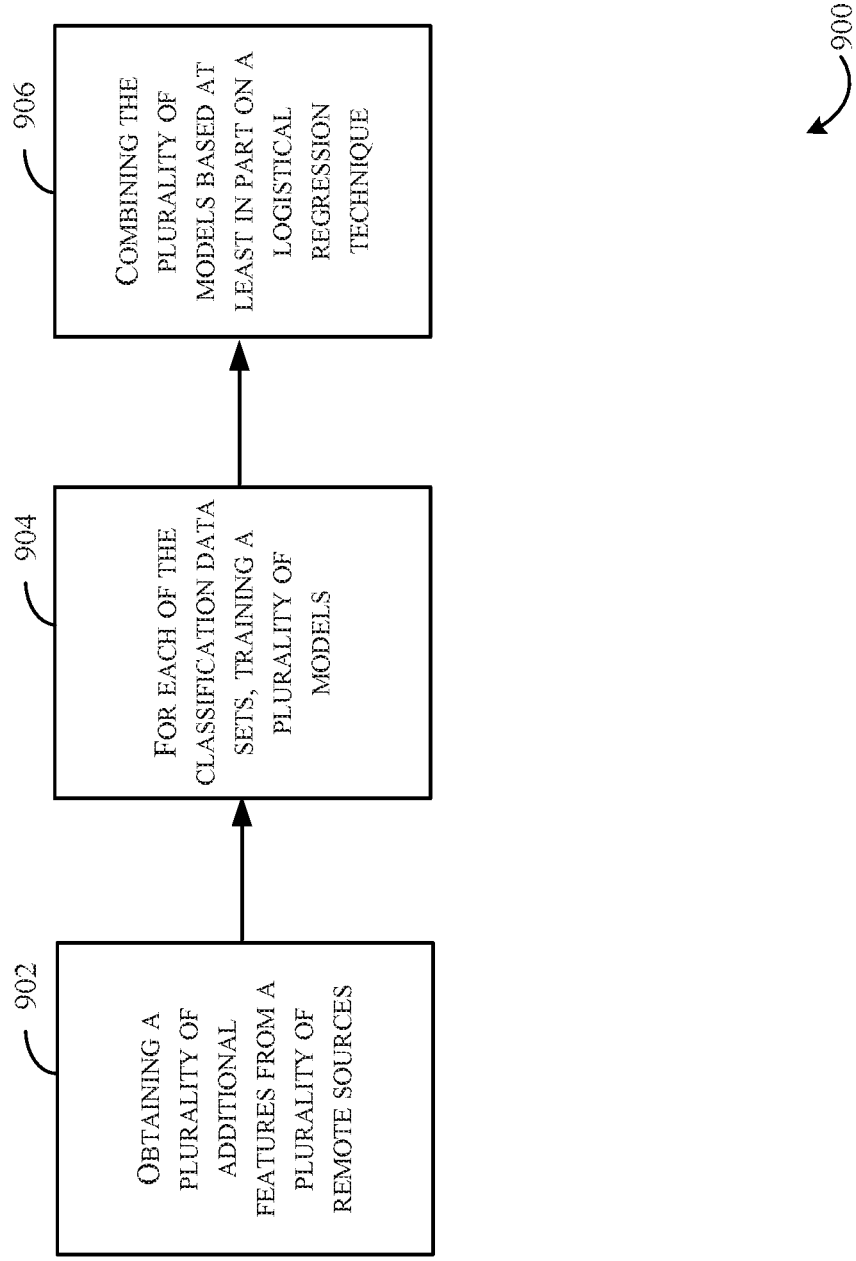
FIG. 9 is a flowchart illustrating still one further example method for generating a classification model based at least in part on additional features, in accordance with at least one embodiment.

FIG. 9 is a flowchart illustrating an example method 900 for generating a maximum entropy model utilizing the classification engine 102 of FIG. 1, based at least in part on additional features, in accordance with at least one embodiment.

The method may begin at block 902, where a plurality of additional features may be obtained from a plurality of remote sources. In at least some examples, remote sources may be utilized to ascertain additional features which can potentially provide more information regarding a classification of an item (e.g., a genre associated with a book). These remote sources may include, but are not limited, an electronic bookshelf and/or category associated with an item offered by a third-party provider, a similarity data set, a number of consumer reviews, one or more editorial reviews, and/or a number of item descriptions. In at least one embodiment, a third-party provider classifies an item (e.g., a book) according to a topic of the item (similar to a genre classification). These classifications may be utilized as features in a maximum entropy model. Although these remote features may not be available for every item in the browse tree 202, at least some portions of these remote features may very well be available. It such a remote feature is available, a feature may be added to the feature set discussed above. For example, if a remote source indicates a "top" shelf for a book, a feature such as "remoteSourceName_ShelfName_AssignmentID" may be added to the feature set. For example, the book "Training Heroes," discussed above, may have remote features that can be derived from a remote source. Thus, upon identifying that the same book is marked on a "shelf" labled "martial arts," a feature such as "remoteSourceName_martial_arts_16571" may be added to the feature set for node 16571.

A further source of feature information may include a similarity data set. A similarity data set may provide a list of books that a customer browsed in the same session along with a given book. Thus, features associated with the list of books may be associated with a particular book as similarity features. For instance, the book "Training heroes" could be viewed in the same session with another book under a martial arts node (node id:16571) and a third book under the biography node (node id:2446). Therefore, a similarity dataset may be generated such that "Sim_16571_16571" is a feature of the book under the martial arts node and "Sim_2446_16571" is another feature corresponding to the book under the biography node.

A further source of feature information may include customer reviews. Customer reviews may provide another source of data which can aid in determining a classification of an item (e.g., a genre of a book). The treatment of such customer reviews includes similar steps as discussed above in connection with FIG. 6. These steps may involve stop word removal, unigram and bigram generation, and removal of words with appearance count below a chosen threshold. For instance, a book with customer review "Excellent book for martial arts learners" assigned to the martial arts node can have features such as custRev_excellent_16571, custRev_martial_16571, custRev_learners_16571, custRev_bi_martial arts_16571, etc.

A further source of feature information may include editorial reviews and/or product descriptions. In some examples, a single feature may be generated from a portion of the editorial reviews and product descriptions. Feature design utilizing the editorial reviews/product descriptions may involve similar steps as that discussed above with respect to customer reviews. For example, a book with editorial review "Good description. Very interactive" associated with a martial arts node with have features such as editRevProdDesc_description 16571, editRevProdDesc_interactive 16571, and editRevProdDesc_bi_good description_16571.

At block 904, after obtaining any available features mentioned above, separte models for each feature source may be trained. In at least one example, two maximum entropy models may be generated for each feature score. One model may utilize the synthetic data set created as described in FIG. 7, the other may use labels obtained using the active learning techniques discussed in connection with FIG. 8. In at least one embodiment, given four features sources, eight different models may be generated, with four models using the synthetic labels and four models using the active learning labels.

After training each model, the outputs of each model are combined using, for example, generalized stacking techniques. For example, given the probability outputs of individual models, a combined output may be generated using logistic regression technique. Logistic regression uses probability output of individual models as features, weighs the probability output and produces a final prediction. In at least some examples, a logistic regression requires labels to be trained. Therefore, a historical data set corresponding to previous labels provided by the crowdsourcing classifiers 108 of FIG. 1 may be obtained. A portion of the historical data set (e.g., 90%) may be used to train the logistical regression model, while another portion of the historical data set (e.g., 10%) may be used to validate the model.

Figure 10:
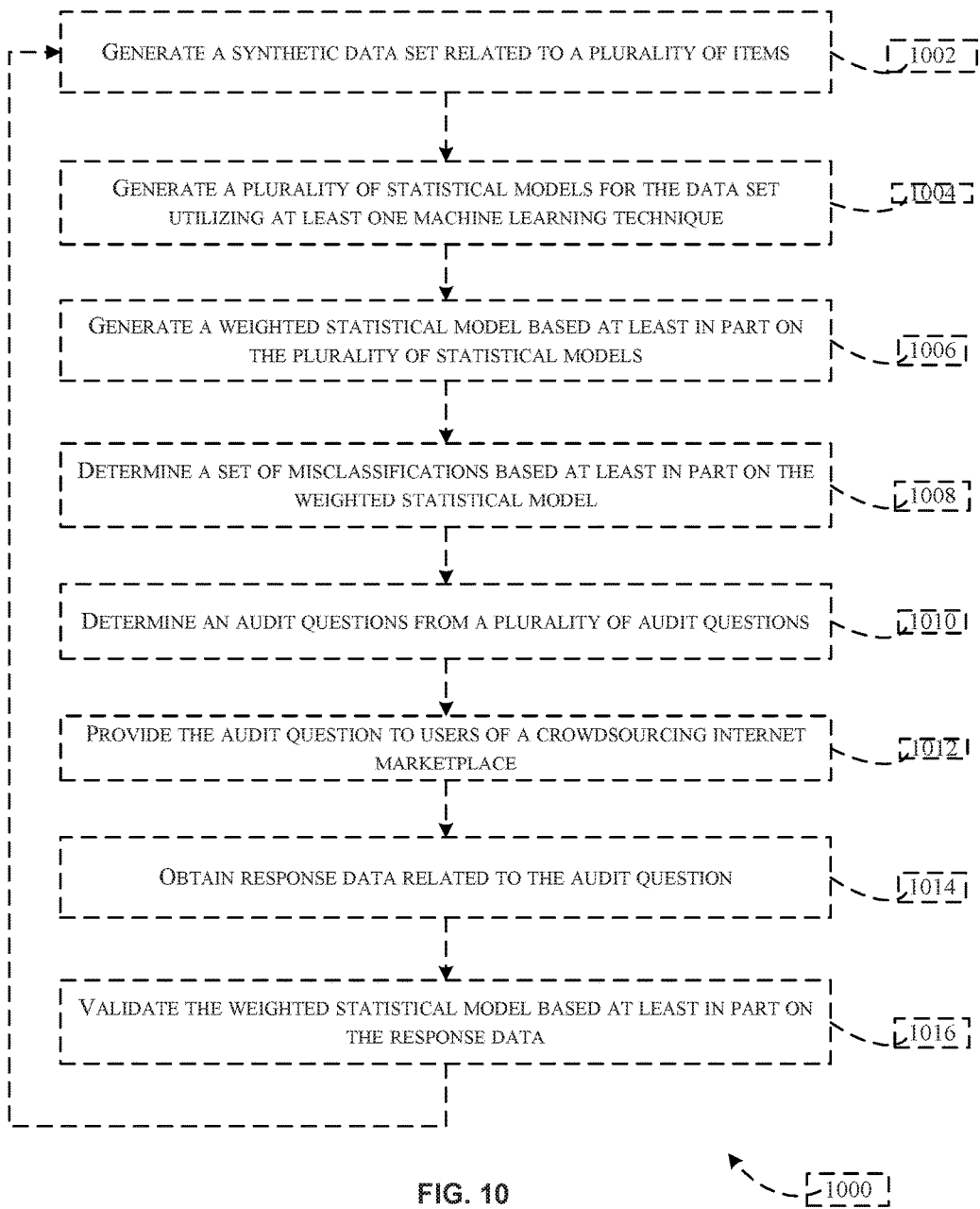
FIG. 10 is a flowchart illustrating an example method for improving a statistical model utilizing the classification engine, in accordance with at least one embodiment.

FIG. 10 is a flowchart illustrating an example method 1000 for improving a statistical model utilizing the classification engine 102 of FIG. 1, in accordance with at least one embodiment. The method 1000 may begin at block 1002, where a synthetic data set related to a plurality of items may be generated. For example, the training data set manager 416 of FIG. 4, a component of the classification engine 102, may obtain a data set (e.g., a number of items in a particular category, for example, "children's books") from the inventory data store 408 of FIG. 4. In at least one example, the training data set manager 416 generates a synthetic data set by assigning a classification, or modifying a classification of at least one item in the data set.

At block 1004, a component of the classification engine 102 (e.g., the statistical model engine 417) may generate a plurality of statistical models for the data set utilizing at least one machine learning technique and the synthetic data set generated at block 1002. For example, the statistical model engine 417 may generate any suitable combination of the models discussed with respect to FIGS. 5-9.

At block 1006, a component of the classification engine 102 (e.g., the statistical model engine 417) may generate a weighted statistical model based at least in part on the plurality of statistical models. For example, the statistical model engine 417 may utilize logistical regression techniques to fuse together a plurality of the models generated at block 1004.

At block 1008, a component of the classification engine 102 (e.g., the statistical model engine 417) may determine a set of misclassifications. In some examples, the set of misclassifications relate to output from the weighted statistical model generated at block 1006.

At block 1010, a component of the classification engine 102 (e.g., the auditing manager 418) may determine an audit question from a plurality of audit questions. For example, the auditing manager 418 may determine a mapping from a category associated with the misclassification and one or more audit questions. Additionally, or alternatively, the auditing manager 418 may utilize a feature of the misclassified item to map to a category for which one or more audit questions are associated.

At block 1012, a component of the classification engine 102 (e.g., the auditing manager 418) may provide the audit questions (or cause the audit question to be provided) to users of a crowdsourcing internet marketplace (e.g., the crowdsourcing classifiers 108 of FIG. 1). For example, the auditing manager 418 may provide the audit question(s) to the service provider computers 104 of FIG. 1 to be provided to the crowdsourcing classifiers 108.

At block 1014, a component of the classification engine 102 (e.g., the auditing manager 418) may obtain response data related to the audit question. The auditing manager 418 may store such response data within the inventory data store 408, the statistical model data store 410, or any suitable storage location. The auditing manager 418 may additionally, or alternatively, provide the response data to the training data set manager 416, the statistical model engine 417, and/or the quality control manager 420.

At block 1016, a component of the classification engine 102 (e.g., the statistical model engine 417) may validate the weighted statistical model based at least in part on the data set. For example, the statistical model engine 417 may utilize a portion of already known classification to validate that the weighted statistical model is providing accurate misclassification predictions. The process 1000 may be repeated any suitable number of times. With each iteration of the process 1000, the weighted statistical model may be improved.

Figure 11:
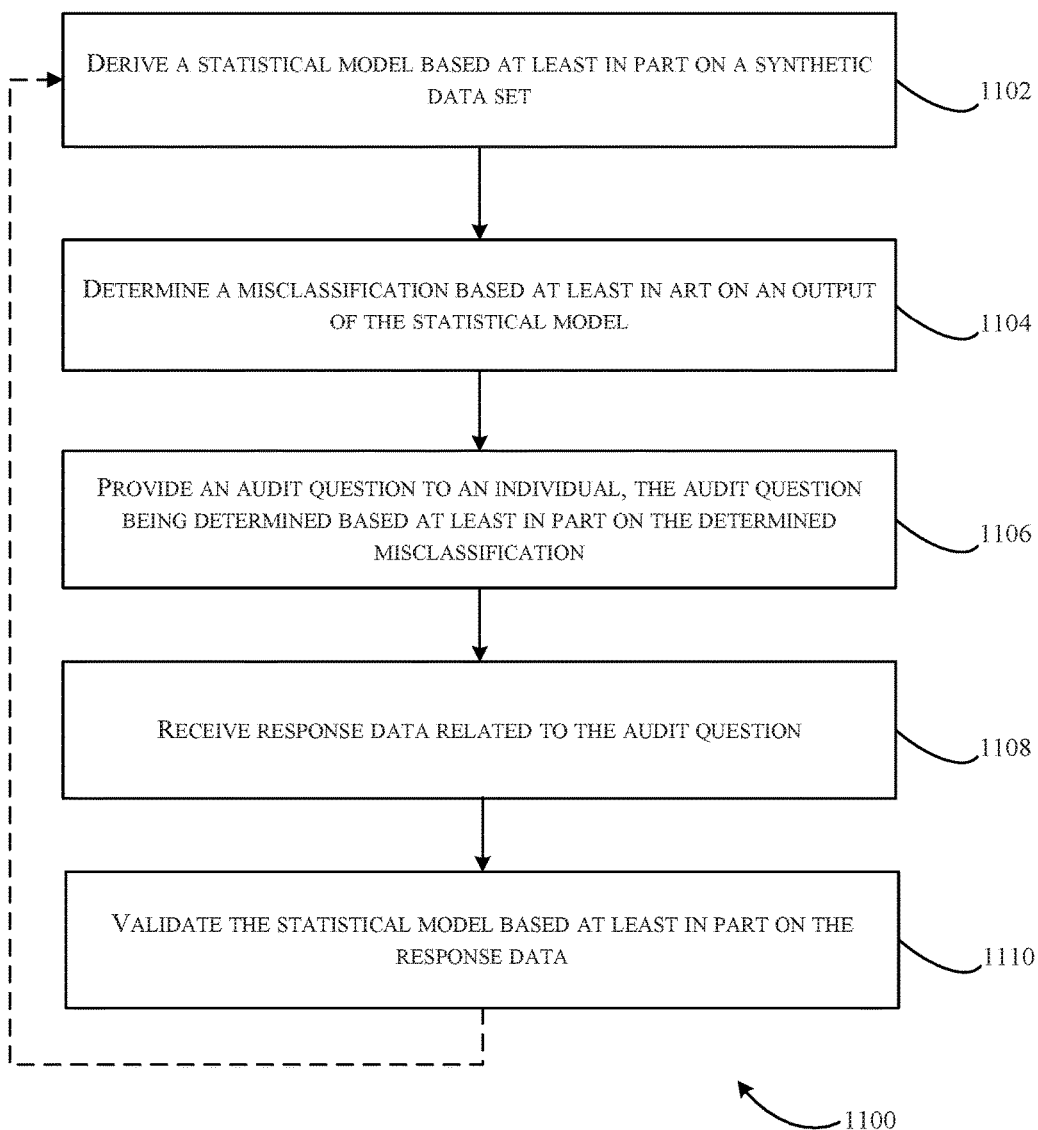
FIG. 11 is a flowchart illustrating another example method for improving a statistical model utilizing the classification engine, in accordance with at least one embodiment.

FIG. 11 is a flowchart illustrating another example method 1100 for improving a statistical model utilizing the classification engine 102 of FIG. 1, in accordance with at least one embodiment. The method 1100 may begin at block 1102, where the classification engine 102 may derive a statistical model based at least in part on a synthetic data set. For example, the training data set manager 416 may, in some cases, provide a synthetic data set for a plurality of items. In at least one example, at least one item is classified. In at least one example, at least one item is unclassified. The synthetic data set may be used by the statistical model engine 417 of FIG. 4 in order to generate the statistical model. In at least one embodiment, the statistical model engine 417 may generate a number of statistical models and then combine the generated models into a single statistical model. The single statistical model may correspond to a model that is configured to predict response data from a particular set of users. For example, the statistical model may be configured to predicted responses from the crowdsourcing classifiers 108.

At block 1104, the classification engine 102 (e.g., the statistical model engine 417) may determine a misclassification based at least in part on an output of the statistical model. In at least one example, the misclassification is determined from a plurality of classifications that have been generated from the statistical model discussed above in connection with block 1102. In some cases, the output of the statistical model provides a probability value that the item is misclassified. The classification engine 102 may determine that an item is misclassified if the output of the statistical model is greater than a threshold value (e.g., 50%, 70%, 80%, etc.).

At block 1106, the classification engine 102 (e.g., the auditing manager 418) may provide an audit question to an individual. In at least one example, the audit question may be determined based at least in part on the determined misclassification from block 1104. In a non-limiting example, an audit question may be determined from a plurality of audit questions based on the misclassification. In at least one embodiment, the classification engine 102 (e.g., the auditing manager 418) may provide the audit questions to users of a crowdsourcing internet marketplace (e.g., the crowdsourcing classifiers 108 of FIG. 1). In at least one example, the quality control manager 420 of FIG. 4 may be configured to control the day and time at which the audit questions may be presented. Upon determining that an audit question should be provided at a particular day and time, the quality control manager 420 may be configured to ensure that the auditing manager 418 is configured to cause the audit question to be provided accordingly.

At block 1108, the classification engine 102 may receive response data related to the audit question. The response data may include one or more responses from the crowdsourcing internet marketplace users (e.g., the crowdsourcing classifiers 108). In at least one example, the quality control manager 420 may filter a portion of the response data from being considered/stored. For example, the quality control manager 420 may utilize any combination of the quality control measures discussed above with respect to FIG. 4 to increase the quality of the received response data. For example, responses from users who have consistently produced incorrect answers to a series of posed golden questions (e.g., inaccurate classifiers) may be weighted less heavily than users who consistently produce correct answers with respect to the series of posed golden questions (e.g., accurate classifiers). In some examples, the inaccurate user's responses may be ignored by the classification engine 102 (e.g., the auditing manager 418).

At block 1110, the statistical model may be validated based at least in part on the response data. For example, the training data set manager 416 may add at least a portion of the response data in the synthetic data set. The statistical model engine 417 may use the modified synthetic data set to retrain a number of statistical models.

Accordingly, in at least one example, the classification engine 102 may randomly assign a classification to an item of a synthetic data set. A statistical model may be derived from the synthetic data set. An output of the statistical model may indicate a misclassification. The classification engine 102 may determine an audit question for the misclassification and present (or cause the audit question to be presented) to a user of a crowdsourcing internet marketplace. The user may respond to the audit question and the classification engine 102 may validate (or improve) the statistical model based on the response. In at least one example, the process 1100 may be repeated any number of times where at least a portion of the response data is added to the synthetic data set and used for the next repetition. Thus, after each repetition of the process 1100, the classification engine 102 may produce a more accurate statistical model based on an ever increasing data set and every increasing validation data elicited from crowdsourcing users.

Figure 12:
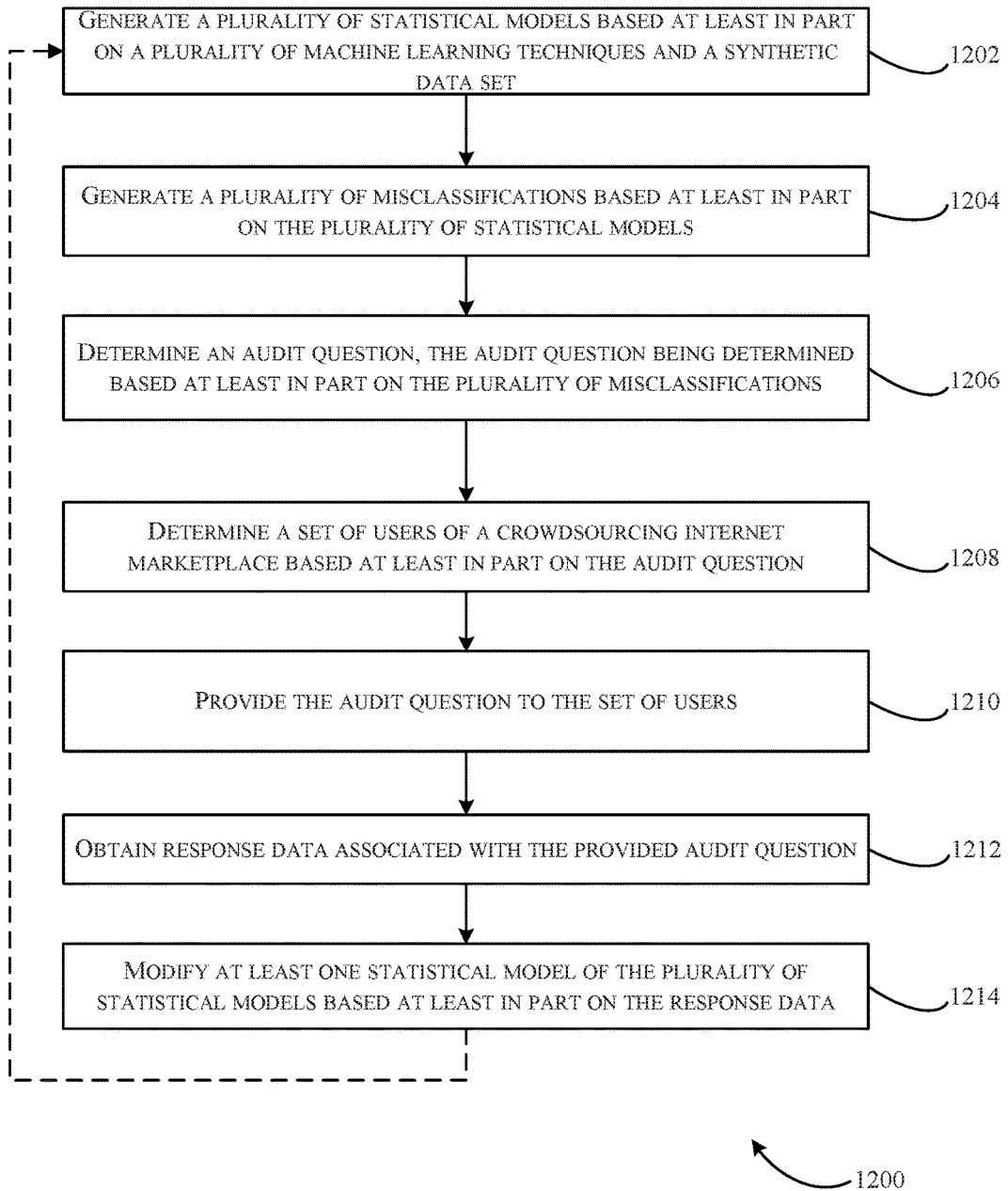
FIG. 12 is a flowchart illustrating still one further example method for improving a statistical model utilizing the classification engine, utilizing the classification engine, in accordance with at least one embodiment.

FIG. 12 is a flowchart illustrating still one further example method 1200 for improving a statistical model utilizing the classification engine 102 of FIG. 1, in accordance with at least one embodiment. The method 1200 may begin at block 1202, where the classification engine 102 generates a plurality of statistical models based at least in part on a plurality of machine learning techniques and a synthetic data set. The machine learning techniques may include supervised, unsupervised, or semi-supervise machine learning techniques. The synthetic data set having been generated by the classification engine 102 (e.g., utilizing at least one random classification).

At block 1204, the classification engine 102 generates a plurality of misclassifications based at least in part on the plurality of statistical models. The plurality of misclassifications corresponding to output from the plurality of statistical models. The output corresponding to predicted response data of a set of crowdsource users in relation to identifying a misclassification.

At block 1206, the classification engine 102 determines an audit question from the plurality of audit questions. In at least one example, the audit questions is determined based at least in part on the plurality of misclassifications. For example, an audit question may include the language "Should this item be classified as an apple?"

At block 1208, the classification engine 102 determines a set of users of a crowdsourcing internet marketplace based at least in part on the audit question. For example, the quality control manager 420 may maintain one or more pools (e.g., a pool with which a portion of the set of crowdsourcing classifiers 108 is associated). The quality control manager 420 may match the audit question determined at block 1210 with a particular pool of users according to a category for which the audit questions relates. In this manner, the quality control manager 420 may determine the set of users who are qualified to answer the audit question.

At block 1210, the classification engine 102 provides (or causes another system to provide) the audit question to the set of users. Response data associated with the provided audit questions is obtained at block 1212 (e.g., by the auditing manager 418). At block 1214, at least one statistical model of the plurality of statistical models is modified (e.g., by the statistical model engine 417) based at least in part on the response data. The process 1200 may be repeated any suitable number of times. In at least some examples, an iteration of the process 1200 may improve the statistical model to be more accurate in its output.

Figure 13:
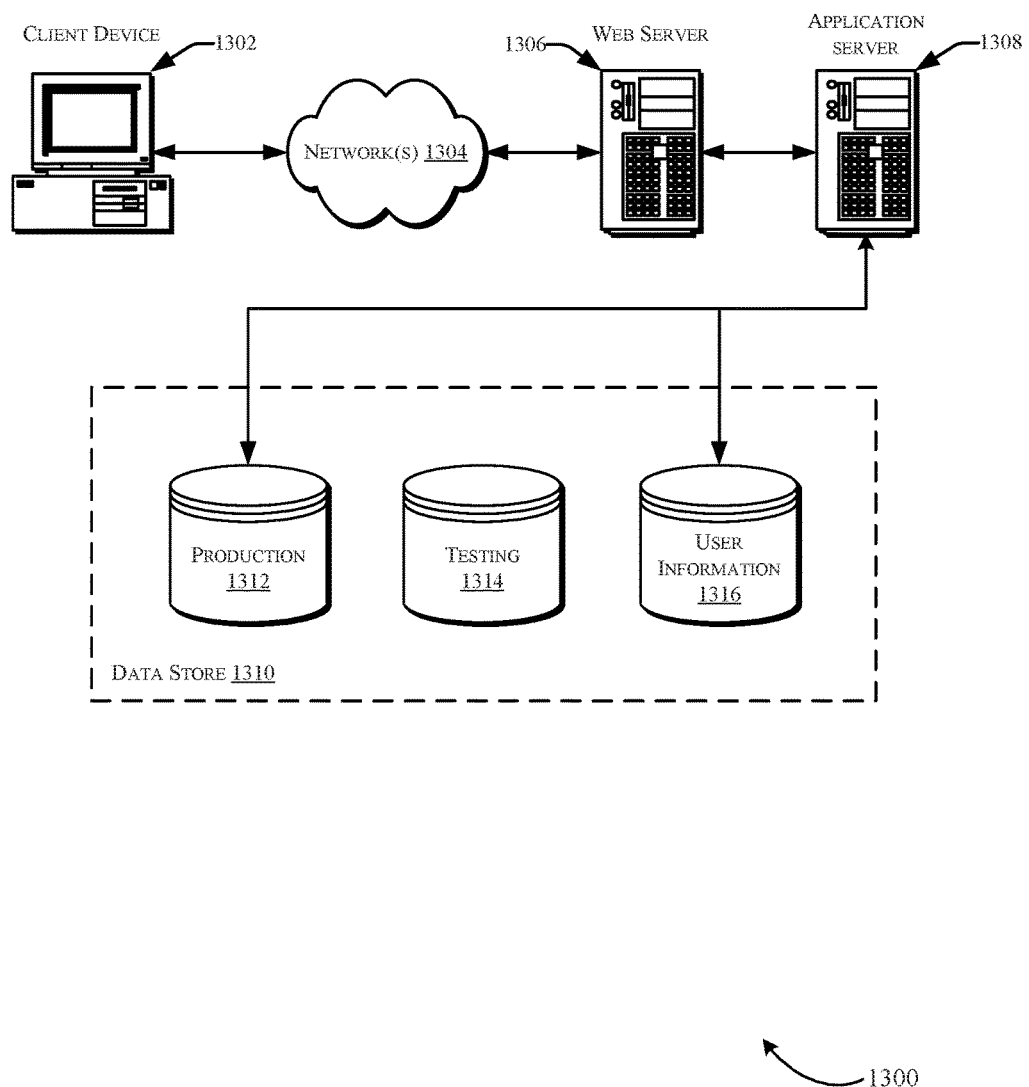
FIG. 13 is a schematic diagram illustrating an example environment for implementing aspects in accordance with at least one embodiment described herein.

FIG. 13 is a schematic diagram illustrating an example environment for implementing aspects in accordance with at least one embodiment described herein. As will be appreciated, although a Web-based environment is used for purposes of explanation, different environments may be used, as appropriate, to implement various embodiments. The environment includes a user device 1302 (e.g., an electronic client device), which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of requests and responses, as well as the delivery of content between the user device 1302 and the at least one application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the at least one application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java*, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

generating, by one or more computing devices, a synthetic data set comprising classifications for a plurality of items of a browse tree, the browse tree indicating relationships between item categories and the plurality of items;

generating, by the one or more computing devices, a plurality of statistical models utilizing at least one machine learning technique and the synthetic data set;

generating, by the one or more computing devices, a weighted statistical model based at least in part on the plurality of statistical models, the weighted statistical model being configured to output a likelihood that a crowdsource user would identify a classification of an item as a misclassification;

determining, by the one or more computing devices, a set of misclassifications based at least in part on the weighted statistical model;

determining, by the one or more computing devices, an audit question from a plurality of audit questions, the audit question being determined based at least in part on the set of misclassifications;

providing, by the one or more computing devices, the audit question to users of a crowdsourcing internet marketplace based at least in part on the set of misclassifications;

obtaining, by the one or more computing devices, response data related to the audit question;

validating, by the one or more computing devices, the weighted statistical model based at least in part on the response data;

detecting, by the one or more computing devices, a subsequent misclassification of the plurality of items utilizing the weighted statistical model; and updating, by the one or more computing devices, the browse tree based at least in part on detecting the subsequent misclassification.

2. The computer-implemented method of claim 1, wherein the plurality of statistical models include a language model, a first maximum entropy model based at least in part on the synthetic data set, a second maximum entropy model based at least in part on an active learning technique, and a third maximum entropy model based at least in part on features obtained from a remote source.

3. The computer-implemented method of claim 1, wherein the synthetic data set initially comprises at least one item that is unclassified.

4. The computer-implemented method of claim 1, further comprising:
providing a plurality of crowdsourcing tasks to an individual, the plurality of crowdsourcing tasks comprising a plurality of questions for which there are a plurality of known answers;
receiving a plurality of responses of the individual;
comparing the plurality of responses to the plurality of known answers;
determining that the plurality of responses of the individual match the plurality of known answers at least above a threshold amount, wherein the audit question is provided to the individual based at least in part on the determination that the plurality of responses of the individual match the plurality of known answers at least above the threshold amount.

5. The computer-implemented method of claim 4, further comprising providing the individual with a plurality of answers from which to select, the plurality of answers corresponding to a question of the plurality of questions.

6. The computer-implemented method of claim 1, further comprising providing a plurality of crowdsourcing tasks to a plurality of crowdsource user, wherein the plurality of crowdsourcing tasks are provided according to a schedule, the schedule specifying that the plurality of crowdsourcing tasks are provided at different days and different times of the different days.

7. The computer-implemented method of claim 1, wherein obtaining the response data comprises:
receiving a plurality of responses from a set of individuals;
determining a majority response from the plurality of responses, wherein the majority response corresponds to a greatest number of same responses of the plurality of responses; and
including the majority response in the responses data.

8. The computer-implemented method of claim 1, wherein obtaining the response data comprises:
receiving a plurality of responses from a set of individuals;
weighting the plurality of responses, wherein weighting the plurality of responses comprises applying a first weight to a first set of responses of the plurality of responses that match a known answer and applying a second weight to a second set of responses of the plurality of responses that are different than the known answer; and
generating the response data from the plurality of responses according to the first weight and second weight.

9. The computer-implemented method of claim 1, wherein obtaining the response data comprises:
receiving a plurality of responses from a first set of individuals;
obtaining a plurality of historical responses of a second set of individuals, wherein the second set of individuals comprises a portion of the first set of individuals;
calculating an overlap value between the first set of individuals and the second set of individuals; and
generating the responses data from the plurality of responses according to the overlap value.

10. The computer-implemented method of claim 1, wherein utilizing the weighted statistical model to determine the set of misclassifications improves throughput of detecting misclassifications of the plurality of items based at least in part on reducing unnecessary audit questions posed to a set of crowdsource users.

11. A computer-implemented method, comprising:
deriving, by one or more computing devices, a statistical model based at least in part on a synthetic data set, the synthetic data set comprising classifications for a plurality of items, the statistical model being configured to output a likelihood that a crowdsource user would identify a classification as a misclassification;
identifying, by the one or more computing devices, a subsequent misclassification of an item based at least in part on the output of the statistical model;
providing, by the one or more computing devices, an audit question to one or more crowdsource users, the audit question being determined based at least in part on the misclassification identified;
receiving, by the one or more computing devices, response data related to the audit question;
assigning a particular classification to the item based at least in part on the response data; and
updating, by the one or more computing devices, the statistical model based at least in part on the response data, the statistical model being utilized as updated to identify subsequent misclassifications.

12. The computer-implemented method of claim 11, wherein deriving the statistical model further comprises:
generating a language model based at least in part on a corpus of items;
generating a first maximum entropy model based at least in part on the synthetic data set,
generating a second maximum entropy model based at least in part on active learning, and
generating a third maximum entropy model based at least in part on additional features,
generating the statistical model based at least in part on the language model, the first maximum entropy model, the second maximum entropy model, and the third maximum entropy model.

13. The computer-implemented method of claim 11, wherein deriving the statistical model comprises:
obtaining a corpus of items, the corpus of items being individually associated with a corresponding set of classification labels;
deriving a feature set for at least one item of the corpus of items, the feature set including at least one of an item name, an item description, an item detail, a brand name, a manufacturer, and a generic keyword;
removing a feature of the feature set based at least in part on a linguistics analysis technique;
adding additional features to the feature set based at least in part on a combination of individual features of the feature set;
computing an occurrence frequency of each feature of the feature set with respect to the corpus of items; and
generating a probability score for each feature of the feature set based at least in part on the occurrence frequency, wherein the probability score indicates a degree to which the item has similar features to other features of other items in the corpus of items.

14. The computer-implemented method of claim 11, wherein deriving the statistical model further comprises:
   obtaining a first corpus of items, wherein the first corpus of items are individually associated with a first classification;
   assigning the first classification to a second corpus of items, wherein the first corpus of items and the second corpus of items comprise the synthetic data set;
   producing a plurality of sample data sets from the synthetic data set; and
   training a plurality of statistical models based at least in part on the plurality of sample data sets from the synthetic data set.

15. The computer-implemented method of claim 11, wherein deriving the statistical model further comprises:
   obtaining a plurality of statistical models;
   obtaining a data set comprises a plurality of classifications for the plurality of items;
   training the plurality of statistical models based at least in part on a subset of the data set;
   generating a predicted data set based at least in part on a combination of outputs from the plurality of statistical models;
   identifying a set of misclassifications from the predicted data set based at least in part on a probability threshold;
   eliciting response data from a set of crowdsourcing users based at least in part on the set of misclassifications identified; and
   training the plurality of statistical models based at least in part on the response data, the response data being provided by the set of crowdsourcing users.

16. The computer-implemented method of claim 11, wherein deriving the statistical model further comprises:
   obtaining a plurality of classification data sets from a plurality of remote sources, the plurality of classification data sets individually comprising a category associated with a particular item of a third-party provider, browsing data associated with a browsing session, a consumer review, an editorial review, or a description associated with the particular item;
   for each of the plurality of classification data sets, training a plurality of statistical models for each of the plurality of classification data sets; and
   combining the plurality of statistical models based at least in part on a logistical regression technique.

17. A system, comprising:
   one or more processors;
   one or more memory devices storing computer-executable instructions, wherein executing the computer-executable instructions with the one or more processors causes one or more computers to collectively, at least:
      generate a plurality of statistical models based at least in part on a plurality of machine learning techniques and a synthetic data set, the synthetic data set comprising classifications for a plurality of items, the plurality of statistical models individually being configured to output a likelihood that a crowdsource user would identify a classification as a misclassification
      identify a plurality of misclassifications based at least in part on the output of the plurality of statistical models;
      determine an audit question from a plurality of audit questions, the audit question being determined based at least in part on the plurality of misclassifications identified;
      determine a set of users of a crowdsourcing internet marketplace based at least in part on the audit question;
      provide the audit question to the set of users of the crowdsourcing internet marketplace;
      obtain response data associated with the audit question provided;
      modify at least one statistical model of the plurality of statistical models based at least in part on the response data; and
      detect a subsequent misclassification of the plurality of items utilizing the at least one statistical model as modified.

18. The system of claim 17, wherein the computer-executable instructions include further instructions that, when executed, causes the one or more computers to collectively, at least:
   generate a weighted statistical model from the plurality of statistical models;
   associate a particular classification with an item of the synthetic data set based at least in part on the response data; and
   modify the weighted statistical model based at least in part on response data.

19. The system of claim 17, wherein the computer-executable instructions that determine the set of users of the crowdsourcing internet marketplace includes further instructions that, when executed, causes the one or more computers to collectively, at least:
   provide a plurality of test questions to a group of crowdsourcing users;
   receive responses associated with the plurality of test questions; and
   determine a sub-group of the group of crowdsourcing users based at least in part on the responses associated with the plurality of test questions.

20. The system of claim 17, wherein modifying the at least one statistical model based at least in part on the response data enables the at least one statistical model to produce more accurate outputs than outputs produced by the at least one statistical model prior to the modification.

* * * * *